(12) United States Patent
King

(10) Patent No.: US 9,788,398 B1
(45) Date of Patent: Oct. 10, 2017

(54) PROGRAMMABLE LIGHT TIMER AND A METHOD OF PROGRAMMING A PROGRAMMABLE LIGHT TIMER

(71) Applicant: John Joseph King, Wheaton, IL (US)

(72) Inventor: John Joseph King, Wheaton, IL (US)

(73) Assignee: Cantigny Lighting Control, LLC, Wheaton, IL (US)

( * ) Notice: Subject to any disclaimer, the term of this patent is extended or adjusted under 35 U.S.C. 154(b) by 0 days.

(21) Appl. No.: 15/131,836

(22) Filed: Apr. 18, 2016

Related U.S. Application Data

(62) Division of application No. 14/944,302, filed on Nov. 18, 2015, now Pat. No. 9,320,122, which is a division of application No. 14/066,724, filed on Oct. 30, 2013, now Pat. No. 9,226,373.

(51) Int. Cl.
*H05B 37/02* (2006.01)
*H05B 39/04* (2006.01)
*H05B 41/36* (2006.01)
*H04W 4/02* (2009.01)

(52) U.S. Cl.
CPC ........ *H05B 37/0281* (2013.01); *H04W 4/028* (2013.01); *H05B 37/0227* (2013.01); *H05B 37/0272* (2013.01)

(58) Field of Classification Search
None
See application file for complete search history.

(56) References Cited

U.S. PATENT DOCUMENTS

| | | |
|---|---|---|
| 4,349,748 A | 9/1982 | Goldstein et al. |
| 4,357,665 A | 11/1982 | Korff |
| 4,521,843 A | 6/1985 | Pezollo et al. |
| 5,046,157 A | 9/1991 | Smith et al. |
| 5,160,853 A | 11/1992 | Simon et al. |
| 5,191,265 A | 3/1993 | D'Aleo et al. |
| 5,442,177 A | 8/1995 | Boulos et al. |
| 5,528,229 A | 6/1996 | Mehta |
| 5,586,048 A | 12/1996 | Coveley |
| 5,793,125 A | 8/1998 | Tarng |
| 5,831,391 A | 11/1998 | MacKay |
| 5,867,099 A | 2/1999 | Keeter |
| 5,949,200 A | 9/1999 | Ference et al. |
| 5,962,989 A | 10/1999 | Baker |
| 5,990,471 A | 11/1999 | Watanabe |
| 6,120,165 A | 9/2000 | Shalvi |
| 6,121,889 A | 9/2000 | Janda et al. |

(Continued)

OTHER PUBLICATIONS

Intermatic ST01 Series Timer User Manual, published Jul. 1, 2009.

(Continued)

*Primary Examiner* — Anh Tran

(57) ABSTRACT

A programmable light timer for implementing a timing pattern is described. The programmable light timer comprises a wireless communication circuit configured to receive, using a wireless communication protocol, a timing pattern and a location from a wireless communication device; and a memory storing the timing pattern and the location; wherein programmable light timer application applies the timing pattern based upon the location received from the wireless communication device. A method of implementing a programmable light timer is also described.

20 Claims, 18 Drawing Sheets

(56) References Cited

U.S. PATENT DOCUMENTS

| | | |
|---|---|---|
| 6,169,377 B1 | 1/2001 | Bryde et al. |
| 6,335,852 B1 | 1/2002 | Nimmo |
| 6,388,399 B1 | 5/2002 | Eckel et al. |
| 6,476,523 B1 | 11/2002 | Lee |
| 6,658,303 B2 | 12/2003 | Hatemata et al. |
| D500,687 S | 1/2005 | Morrison et al. |
| 6,888,323 B1 | 5/2005 | Null et al. |
| 6,943,296 B2 | 9/2005 | Perrella et al. |
| 6,958,584 B2 | 10/2005 | Nakamura et al. |
| 6,965,801 B2 | 11/2005 | Hall |
| 7,039,397 B2 | 5/2006 | Chuey |
| 7,047,092 B2 | 5/2006 | Wimsatt |
| 7,167,777 B2 | 1/2007 | Budike |
| 7,255,596 B2 | 8/2007 | Pyrros |
| 7,345,998 B2 | 3/2008 | Cregg et al. |
| 7,382,100 B2 | 6/2008 | Johnson et al. |
| 7,405,524 B2 | 7/2008 | Null et al. |
| 7,436,132 B1 | 10/2008 | Null |
| 7,463,148 B2 | 12/2008 | Leen |
| 7,575,470 B2 | 8/2009 | Pyrros |
| 7,579,717 B2 | 8/2009 | Blair et al. |
| 7,627,313 B2 | 12/2009 | Aretz et al. |
| 7,628,643 B2 | 12/2009 | Pyrros |
| 7,663,325 B2 | 2/2010 | McDonough et al. |
| 7,683,755 B2 | 3/2010 | Ostrovsky et al. |
| 7,689,875 B2 | 3/2010 | Cahill et al. |
| 7,694,005 B2 | 4/2010 | Reckamp et al. |
| 7,774,648 B2 | 8/2010 | Majewski et al. |
| 7,847,706 B1 | 12/2010 | Ross et al. |
| 7,852,234 B1 | 12/2010 | Borenstein et al. |
| 7,859,136 B2 | 12/2010 | Blair et al. |
| 7,863,829 B2 | 1/2011 | Sayers et al. |
| 8,050,145 B2 * | 11/2011 | Ostrovsky ............... G04F 1/005 307/141 |
| 8,054,175 B2 | 11/2011 | Kato et al. |
| 8,068,014 B2 | 11/2011 | Steiner et al. |
| 8,084,700 B1 | 12/2011 | Massaro et al. |
| 8,086,357 B2 | 12/2011 | Marellapudi et al. |
| 8,154,154 B2 | 4/2012 | Buerer |
| 8,223,508 B2 | 7/2012 | Baarman et al. |
| 8,242,714 B2 | 8/2012 | Weightman et al. |
| 8,344,666 B1 | 1/2013 | King |
| 8,344,667 B1 | 1/2013 | King |
| 8,446,263 B2 | 5/2013 | King |
| 8,478,450 B2 | 7/2013 | Lu et al. |
| 8,489,715 B2 | 7/2013 | Averbuch et al. |
| 8,508,135 B2 | 8/2013 | King |
| 8,508,148 B1 | 8/2013 | Carley et al. |
| 8,513,891 B2 | 8/2013 | Hsieh |
| 8,531,134 B2 | 9/2013 | Chemel |
| 8,558,464 B2 | 10/2013 | King |
| 8,583,263 B2 | 11/2013 | Hoffberg et al. |
| 8,610,305 B2 | 12/2013 | Sarid et al. |
| 8,742,694 B2 | 6/2014 | Bora et al. |
| 8,816,610 B2 | 8/2014 | King |
| 8,901,858 B2 | 12/2014 | King |
| 9,024,545 B2 | 5/2015 | Bloch et al. |
| 9,049,116 B2 | 6/2015 | King |
| 9,204,523 B2 | 12/2015 | Reed et al. |
| 9,226,373 B2 | 12/2015 | King |
| 2004/0260853 A1 | 12/2004 | Cho |
| 2005/0242753 A1 | 11/2005 | Morrison |
| 2005/0253538 A1 | 11/2005 | Shah et al. |
| 2006/0012312 A1 | 1/2006 | Lyle et al. |
| 2006/0012317 A1 | 1/2006 | Chiu et al. |
| 2006/0038499 A1 | 2/2006 | Yeh |
| 2006/0125324 A1 | 6/2006 | Lai Lui |
| 2006/0202851 A1 | 9/2006 | Cash et al. |
| 2006/0239123 A1 | 10/2006 | Chen |
| 2006/0250745 A1 | 11/2006 | Butler et al. |
| 2007/0109763 A1 | 5/2007 | Wolf et al. |
| 2007/0109781 A1 | 5/2007 | Chiu |
| 2007/0183270 A1 | 8/2007 | Sakamoto et al. |
| 2007/0206375 A1 | 9/2007 | Piegras et al. |
| 2008/0001551 A1 | 1/2008 | Abbondanzio et al. |
| 2008/0229125 A1 | 9/2008 | Lin et al. |
| 2008/0232810 A1 | 9/2008 | Lu et al. |
| 2008/0258644 A1 | 10/2008 | Altonen et al. |
| 2008/0265685 A1 | 10/2008 | Blair et al. |
| 2008/0309253 A1 | 12/2008 | Guanrong et al. |
| 2009/0059603 A1 | 3/2009 | Recker |
| 2009/0122571 A1 | 5/2009 | Simmons et al. |
| 2009/0190443 A1 | 7/2009 | Huizi et al. |
| 2009/0225811 A1 | 9/2009 | Albert et al. |
| 2009/0273243 A1 | 11/2009 | Blair et al. |
| 2010/0025210 A1 | 2/2010 | Simard et al. |
| 2010/0045205 A1 | 2/2010 | Bergman et al. |
| 2010/0052487 A1 | 3/2010 | Stein |
| 2010/0052894 A1 | 3/2010 | Steiner et al. |
| 2010/0176744 A1 | 7/2010 | Lee et al. |
| 2010/0244706 A1 | 9/2010 | Steiner et al. |
| 2010/0271802 A1 | 10/2010 | Recker |
| 2010/0295454 A1 | 11/2010 | Reed |
| 2011/0018448 A1 | 1/2011 | Metchear, III et al. |
| 2011/0101868 A1 | 5/2011 | Weiss |
| 2011/0285292 A1 | 11/2011 | Mollnow et al. |
| 2011/0316453 A1 | 12/2011 | Ewing |
| 2012/0025960 A1 * | 2/2012 | King ............... H05B 37/0281 340/309.8 |
| 2012/0091902 A1 | 4/2012 | Radermacher |
| 2012/0139417 A1 | 6/2012 | Mironichev et al. |
| 2012/0181935 A1 | 7/2012 | Velazquez |
| 2012/0194102 A1 | 8/2012 | King |
| 2013/0026947 A1 | 1/2013 | Economy et al. |
| 2013/0033187 A1 | 2/2013 | Brown et al. |
| 2013/0043788 A1 | 2/2013 | O'Brien |
| 2013/0241432 A1 | 9/2013 | Ebihara et al. |
| 2014/0043544 A1 | 2/2014 | Kasuga |
| 2014/0064260 A1 | 3/2014 | Masterbrook et al. |
| 2014/0070707 A1 | 3/2014 | Nagazoe |
| 2014/0098247 A1 | 4/2014 | Rao et al. |
| 2014/0117871 A1 | 5/2014 | Swatsky et al. |
| 2014/0139137 A1 | 5/2014 | Recker et al. |
| 2014/0166447 A1 | 6/2014 | Thea et al. |
| 2014/0167621 A1 | 6/2014 | Trott et al. |
| 2014/0204214 A1 | 7/2014 | Singhal |
| 2014/0254829 A1 | 9/2014 | Wang et al. |
| 2014/0265836 A1 | 9/2014 | Nourbakhsh et al. |
| 2014/0270237 A1 | 9/2014 | Wang et al. |
| 2014/0273892 A1 | 9/2014 | Nourbakhsh |
| 2014/0292222 A1 | 10/2014 | Velazquez |
| 2014/0354162 A1 | 12/2014 | Sun et al. |
| 2014/0368115 A1 | 12/2014 | Ando et al. |
| 2015/0035437 A1 | 2/2015 | Panopoulos et al. |
| 2015/0061546 A1 | 3/2015 | Stack et al. |

OTHER PUBLICATIONS

GE 7 Day Digital Timer User Instructions, published Jul. 30, 2010.
GE Smart Digital Timer, published Jul. 2010.
GE Digital Time Switch, published Nov. 24, 2009.
SmartLink-INSTEON Smarthome, published Aug. 27, 2008.
3COM IEEE 802.11 Wireless LANs, published Jan. 2000.
Schlage Link RP200 LiGHT Module User Manual, published Mar. 2009.
Intermatic Model El600 Self-Adjsuting Wall Switch Timer, Installation and User Instructions, published Jul. 2009.
GE Wireless Lighting Control 45631 Keypad Controller User Manual, published Apr. 2010.
Grasslin Talento Plus Product Catalogue, published Apr. 1, 2008.
Aube Technologies T1033 Installation and Instruction Guide, Programmable Wall Switch, published Nov. 30, 2006.
GE Z-Wave Wireless Controls 45603—Florescent and Appliance Module, published Apr. 1, 2010.
Talento Dialog Switching Program User Manual, published Nov. 25, 2000.
GE Outdoor Timer User Manual, published Nov. 24, 2009.
Diehl Controls User Manual, published Apr. 2002.
Hydrofarm Digital Grounded 7 Day Timer User Manual, published Sep. 2009.
Honeywell RPLS 740A User Manual, published May 17, 2010.

(56) References Cited

OTHER PUBLICATIONS

Heath/Zenith Motion Sensor Light Control Model SL-5408, published 2004.
Honeywell RPLS540A/RPLS541A User Guide, published May 17, 2010.
Leviton Indoor Plug-In Timer, PK93194-10-00-2A, published 2010.
Tork Digtial Time Switch Instruction Manual DMZ200 BP, published Mar. 27, 2007.
Tork Digital Lighting Control Instruction Manual, DLC400BP, published Jun. 1, 2007.
Aube T1062 User Manual, published Jul. 4, 2008.
Sylvania SA 170 User Manual, published Aug. 17, 2005.
Intermatic SS5 User Manual, published Apr. 20, 2009.
Intermatic HA07 Master Controller User Manual, published 2007.
Intermatic SS8 User Manual, published Sep. 13, 2002.
Intermatic EJ500C User Manual, published Aug. 3, 2004.
Sywylite LST100 User Manual, published 2010.
Westek TE02 DBH User Manual, published 2010.
Leviton LT112-10W User Manual, published 2010.
Leviton In-Wall Timer VPT20 User Manual, published 2010.
NEXTGEN programming software, published 2004.
Intermatic ET90000 Help Support, published 2013.
Belkin WeMo Support—Selling Up WeMo, published 2013.
Belkin WeMo Support—How to create or edit Rules for WeMo using a mobile device, published 2013.
GE SunSmart Digital Timer published 2010.
Leviton Product Data Wireless Infrared Occupancy Sensors, published 2008.
Sylvania Model SA135, published 2010.
Setting up Zigbee Ethernet Gateway, published Dec. 17, 2008.
US Cellular LG Wine, published Dec. 12, 2008.
Theben New Products for 2008, published 2008.
Theben Selekta, published 2008.
Woods TM16R Series Timers, published Sep. 6, 2007.
Woods TM29HR Timer, published Sep. 6, 2007.
Woods 2500 Timer, published 2007.
Woods Timer Model 50043, published 2007.
Guide to Obelisk Top2 Software V3.6 published 2012.
Defiant Timer Model 49820 User Manual, published 2013.
GE Wall Box Time Switch Instructions, Model 15303, Jan. 2013.
Defiant Timer Item 1001-524-883 Use and Care Guide Push Button Countdown Timer, Jul. 5, 2011.
Theben New Products, 2010.
Woods Timer Model 50000 24-hour Indoor Mechanical Timer 2-C, Aug. 15, 2013.
TheBen EM LAN top2 TR641/642/644.
Ferroli HE Programmer instructions, Aug. 12, 2006.
Radioshack Mini Timer Programmable Controller, Sep. 8, 1999.
Theben TR644 Top 2, Article No. 6440100, Jun. 23, 2016.
Home Easy HE-200/210/220 Remote Control Timer, 2007.
Larsen and Toubro Astronomical Time Switches, Feb. 2, 2013.
TCP-Remote Lighting Kit, Oct. 8, 2013.
RT-200 Astronomical Time Switch, Dec. 2010.
A System for Smart-Home Control of Appliances Based on Timer and Speech Interaction, Jan. 2006.
Design of Multi-Functional Street Light Control System Based on AT89S52 Single-Chip Microcomputer, May 2010.
Design and Implementation of WiFi Based Home Automation System, 2012.
Case Studies of Mental Models in Home Heat Control: Searching for Feedback, Valve, Timers and Switch Theories, May 2013.
RF Remote Control of Power Line Devices Using Embedded System, May 2013.
Light Symphony Base Station, Part No. LS0900BSR, 2012.
House Control Language, Aalbourg University, 2008.
Siemens-TR-648-310, published 2002.
Siemens 16 Channel Time Switch, published Mar. 2004.
Siemens LCP3000EZ System, published 2007.

\* cited by examiner

| Zipcode | Region |
|---------|--------|
| 00501 | NE |
| 00502 | NE |
| ⋮ | ⋮ |
| 02169 | NE |
| ⋮ | ⋮ |
| 60068 | NC |
| 60189 | NC |
| 60189 | NC |
| ⋮ | ⋮ |
| 90210 | CP |
| ⋮ | ⋮ |
| 95124 | SP |

FIG. 17

| DST Period Start Date | DST Period End Date | DST Fall Back Time Change | DST Spring Forward Time Change | DST Code |
|---|---|---|---|---|
| SEP 15 | APR 1 | Last Sun in OCT | First Sun in MAR | 901 |
| SEP 15 | APR 1 | Last Sun in OCT | 2nd Sun in MAR | 902 |
| SEP 15 | APR 1 | First Sun in NOV | First Sun in MAR | 903 |
| SEP 15 | APR 1 | First Sun in Nov | 2nd Sun in MAR | 904 |
| SEP 15 | APR 15 | Last Sun in OCT | First Sun in MAR | 905 |
| SEP 15 | APR 15 | Last Sun in OCT | 2nd Sun in MAR | 906 |
| SEP 15 | APR 15 | First Sun in NOV | First Sun in MAR | 907 |
| SEP 15 | APR 15 | First Sun in Nov | 2nd Sun in MAR | 908 |
| SEP 30 | APR 1 | Last Sun in OCT | First Sun in MAR | 909 |
| SEP 30 | APR 1 | Last Sun in OCT | 2nd Sun in MAR | 910 |
| SEP 30 | APR 1 | First Sun in NOV | First Sun in MAR | 911 |
| SEP 30 | APR 1 | First Sun in Nov | 2nd Sun in MAR | 912 |
| ⋮ | ⋮ | ⋮ | ⋮ | ⋮ |
| OCT 15 | APR 1 | Last Sun in OCT | First Sun in MAR | 938 |
| OCT 15 | APR 1 | Last Sun in OCT | 2nd Sun in MAR | 939 |
| OCT 15 | APR 1 | First Sun in NOV | First Sun in MAR | 940 |
| OCT 15 | APR 1 | First Sun in Nov | 2nd Sun in MAR | 941 |

FIG. 19

| | On Time | Off Time | Pattern |
|---|---|---|---|
| Fixed Time Year-round | 4:00 PM | 1:00 AM | 1 |
| | 4:00 PM | 5:00 AM | 111 |
| | 4:00 PM | 6:00 AM | 112 |
| | 4:00 PM | 7:00 AM | 113 |
| | ⋮ | ⋮ | ⋮ |
| | 5:00 PM | 1:00 AM | 121 |
| | 5:00 PM | 5:00 AM | 122 |
| | 5:00 PM | 5:00 AM | 123 |
| | ⋮ | ⋮ | ⋮ |
| | 6:00 PM | 7:00 AM | 189 |
| | Standard Time (Long Daylight Hrs)-On/Off | DST (Short Daylight Hours)-On/Off | |
| Standard/DST | 4:00 PM/1:00 AM | 7:00 PM/1:00 AM | 2 |
| | 4:00 PM/5:00 AM | 7:00 PM/5:00 AM | 211 |
| | 4:00 PM/6:00 AM | 7:00 PM/6:00 AM | 212 |
| | 4:00 PM/7:00 AM | 7:00 PM/7:00 AM | 213 |
| | ⋮ | ⋮ | ⋮ |
| | 5:00 PM/1:00 AM | 8:00 PM/5:00 AM | 221 |
| | 5:00 PM/5:00 AM | 8:00 PM/6:00 AM | 222 |
| | 5:00 PM/6:00 AM | 8:00 PM/7:00 AM | 223 |
| | ⋮ | ⋮ | ⋮ |
| | 8:00 PM/7:00 AM | 9:00 PM/7:00 AM | 289 |

| | Spring On/Off | Summer On/Off | Fall On/Off | Winter On/Off | |
|---|---|---|---|---|---|
| 4 Seasons | 4:00 PM/1:00 AM | 7:00 PM/1:00 AM | 5:00 PM/1:00 AM | 4:00 PM/1:00 AM | 3 |
| | 4:00 PM/5:00 AM | 7:00 PM/5:00 AM | 5:00 PM/5:00 AM | 4:00 PM/5:00 AM | 311 |
| | 4:00 PM/6:00 AM | 7:00 PM/6:00 AM | 5:00 PM/6:00 AM | 4:00 PM/6:00 AM | 312 |
| | 4:00 PM/7:00 AM | 7:00 PM/7:00 AM | 5:00 PM/7:00 AM | 4:00 PM/7:00 AM | 313 |
| | ⋮ | ⋮ | ⋮ | ⋮ | ⋮ |
| | 7:00 PM/5:00 AM | 8:00 PM/5:00 AM | 6:00 PM/5:00 AM | 5:00 PM/5:00 AM | 321 |
| | 7:00 PM/6:00 AM | 8:00 PM/6:00 AM | 6:00 PM/6:00 AM | 5:00 PM/6:00 AM | 322 |
| | 7:00 PM/7:00 AM | 8:00 PM/7:00 AM | 6:00 PM/7:00 AM | 5:00 PM/7:00 AM | 323 |
| | ⋮ | ⋮ | ⋮ | ⋮ | ⋮ |
| | 8:00 PM/7:00 AM | 9:00 PM/7:00 AM | 6:00 PM/7:00 AM | 6:00 PM/7:00 AM | 389 |

| | On Time/Offset | Off Time/Offset | Pattern |
|---|---|---|---|
| Astronomic | Astronomic Dusk/+ 1hr | Astronomic Dawn/-1 hr | 4 |
| | Astronomic Dusk/none | Astronomic Dawn/None | 411 |
| | Astronomic Dusk/+0.5 hrs | 5:00 AM/N/A | 412 |
| | Astronomic Dusk/+1.5 hrs | 6:00 AM/N/A | 413 |
| | ⋮ | ⋮ | |
| | 4:00 PM/None | Astronomic Dawn/None | 421 |
| | 4:00 PM/None | Astronomic Dawn/-0.5 hrs | 422 |
| | 4:00 PM/None | Astronomic Dawn/-1.0 hrs | 423 |
| | ⋮ | ⋮ | |
| | 4:00 PM/None | Astronomic Dawn/-2.0 hrs | 489 |

FIG. 16

| Region | Time Period of Date | Average Dusk Time | Average Dawn Time |
|---|---|---|---|
| NE | Full Year | 7:00 PM | 6:00 AM |
| | Standard Time | 7:30 PM | 5:30 AM |
| | Daylight Savings Time | 6:30 PM | 7:00 AM |
| | Spring | 7:30 PM | 6:00 AM |
| | Summer | 8:00 PM | 5:30 AM |
| | Fall | 6:30 PM | 6:30 AM |
| | Winter | 5:00 PM | 7:00 AM |
| | January | 5:30 PM | 7:15 AM |
| | February | 4:45 PM | 7:10 AM |
| | ⋮ | ⋮ | ⋮ |
| | December | 5:40 PM | 6:55 AM |
| | January 1, 2013 | 5:30 PM | 7:15 AM |
| | January 2, 2013 | 5:31 PM | 7:14 AM |
| | January 3, 2013 | 5:33 PM | 7:11 AM |
| | ⋮ | ⋮ | ⋮ |
| | December 31, 2013 | 5:39 PM | 6:49 AM |
| NC | Full Year | 6:55 PM | 6:03 AM |
| | Standard Time | 7:25 PM | 5:33 AM |
| | Daylight Savings Time | 6:25 PM | 7:04 AM |
| | Spring | 7:25 PM | 6:03 AM |
| | Summer | 7:55 PM | 5:33 AM |
| | Fall | 6:25 PM | 6:33 AM |
| | Winter | 4:55 PM | 7:03 AM |
| | January | 5:25 PM | 7:17 AM |
| | February | 4:40 PM | 7:13 AM |
| | ⋮ | ⋮ | ⋮ |
| | December | 5:35 PM | 6:58 AM |
| | January 1, 2013 | 5:25 PM | 7:18 AM |
| | January 2, 2013 | 5:26 PM | 7:17 AM |
| | January 3, 2013 | 5:28 PM | 7:14 AM |
| | ⋮ | ⋮ | ⋮ |
| | December 31, 2013 | 5:34 PM | 6:54 AM |
| ⋮ | ⋮ | ⋮ | ⋮ |
| SP | Full Year | 7:07 PM | 6:05 AM |
| | Standard Time | 7:36 PM | 5:36 AM |
| | ⋮ | ⋮ | ⋮ |
| | January 3, 2013 | 5:39 PM | 7:16 AM |
| | ⋮ | ⋮ | ⋮ |
| | December 31, 2013 | 5:44 PM | 6:54 AM |

FIG. 18

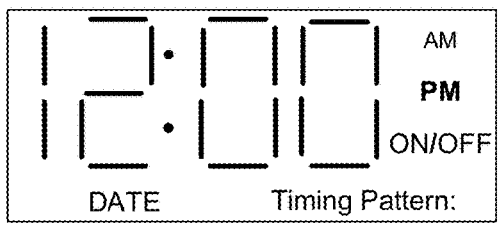
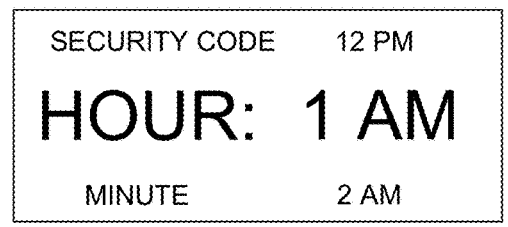
FIG. 21    FIG. 22
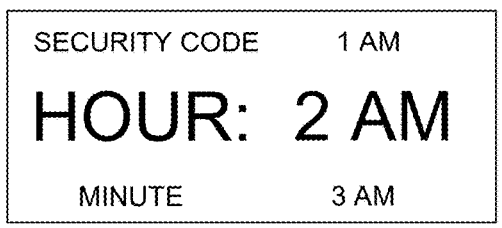
FIG. 23    FIG. 24
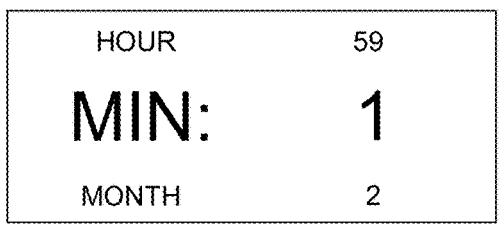
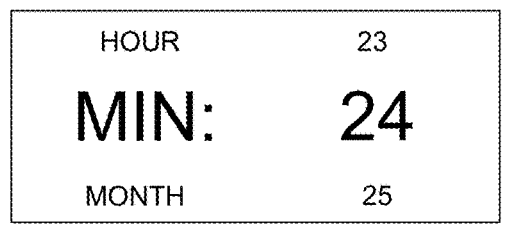
FIG. 25    FIG. 26
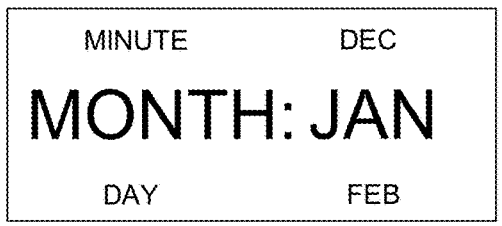
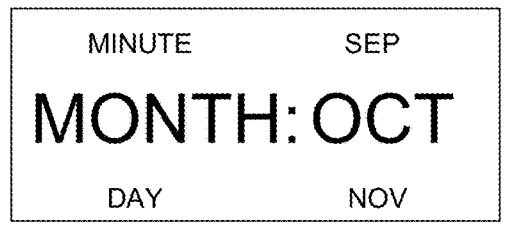
FIG. 27    FIG. 28
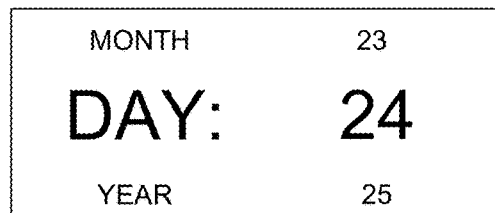
FIG. 29    FIG. 30

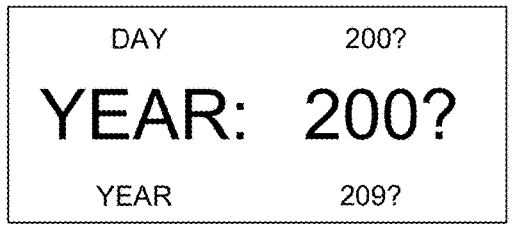
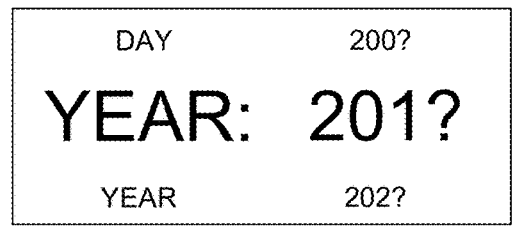
FIG. 31　　　　　　　　　　FIG. 32
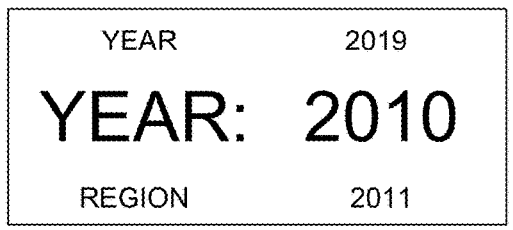
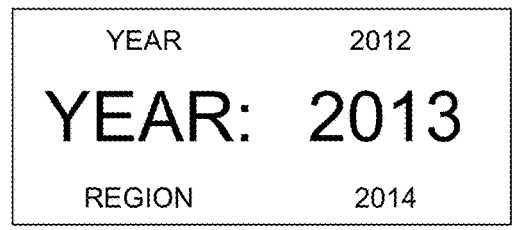
FIG. 33　　　　　　　　　　FIG. 34
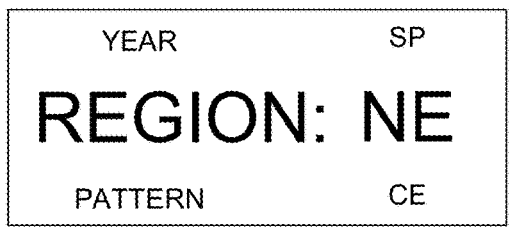
FIG. 35　　　　　　　　　　FIG. 36
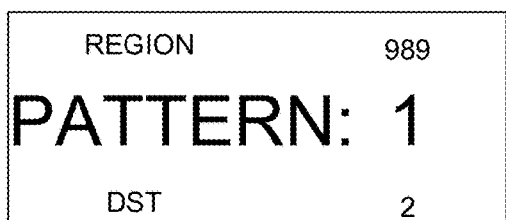
FIG. 37　　　　　　　　　　FIG. 38
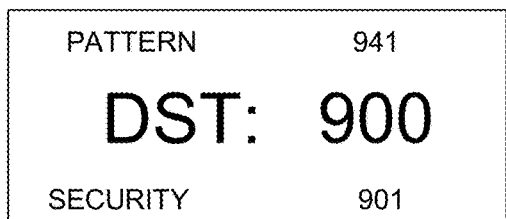
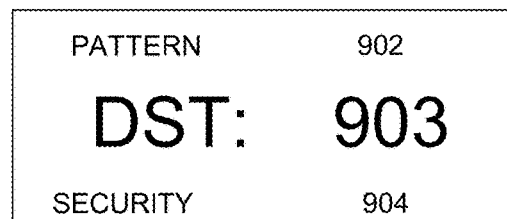
FIG. 39　　　　　　　　　　FIG. 40

FIG. 41
FIG. 42
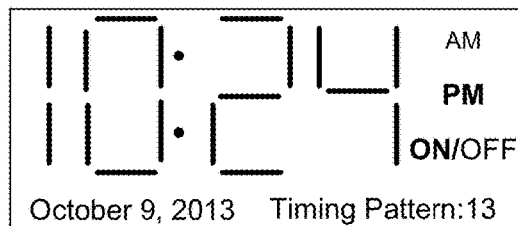
FIG. 43
| FIELD | DATA |
|---|---|
| Time | 10:24 PM |
| Date | October 24, 2013 |
| Region | NC |
| Timing Pattern | 13 |
| DST Code | 903 |
| Security Code | 013 |
FIG. 44
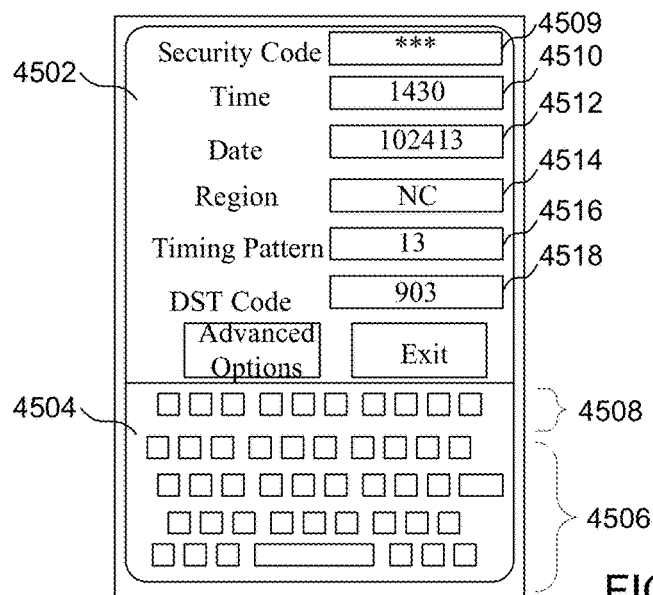
FIG. 45

PROGRAMMABLE LIGHT TIMER AND A METHOD OF PROGRAMMING A PROGRAMMABLE LIGHT TIMER

FIELD OF THE INVENTION

The present invention relates generally to lighting control products, and in particular, to a programmable light timer and a method of implementing a programmable light timer. Applicant claims priority on co-pending U.S. application Ser. No. 14/944,302, filed on Nov. 18, 2015, and to U.S. application Ser. No. 14/066,724, filed on Oct. 30, 2013, which is the parent application of U.S. application Ser. No. 14/944,302 and now granted U.S. Pat. No. 9,226,373.

BACKGROUND OF THE INVENTION

Conventional timers for lights, such as timers for indoor lamps or outdoor lights for example, either provide little functionality, or are difficult to program. Because of the limited size of the conventional timers, the size of the screen and the size of the interface for programming the timer are both relatively small. This is particularly true of an in-wall timer, which must fit in an electrical box, commonly called a junction box. Not only does a user of the in-wall timer have to read a very small display, but the user has to advance through a menu shown on the small display using a very limited interface which is provided on the remaining portion of the timer. Entering data on such a user interface is particularly difficult because the in-wall timer is fixed and generally positioned well below eye level.

Further, conventional timers are often unreliable. For example, conventional mechanical timers often malfunction over time, leaving the user without the use of the timer for some period of time and requiring the user to incur the expense of replacing the timer. Moreover, advanced digital timers having electronic displays may be difficult to operate, providing a barrier to certain groups of people who would otherwise use a timer, but don't want to struggle through a complex interface on the small screen of the timer to properly set the timer. For example, not only is the display very small and difficult to read, but the user interface is difficult to navigate on such a small display. These groups of users are either left with no timing operation for their lights, or timers which do not provide the timing operation that they desire. Without an effective timer for a light for example, the light may be on significantly longer than necessary, not only wasting energy but in many cases increasing pollution as a result. As energy consumption world-wide continues to increase, it is important to reduce or minimize the consumption of energy in any way possible. The timer of the present invention provides significant benefits in reducing energy consumption.

SUMMARY OF THE INVENTION

A programmable light timer for implementing a timing pattern is described. The programmable light timer comprises a wireless communication circuit configured to receive, using a wireless communication protocol, a timing pattern and a location from a wireless communication device; and a memory storing the timing pattern and the location; wherein programmable light timer application applies the timing pattern based upon the location received from the wireless communication device.

Another implementation of a programmable light timer for implementing a timing pattern comprises a wireless communication circuit configured to receive, using a wireless communication protocol, a location and a timing pattern having a dusk setting or a dawn setting from a wireless communication device; and a memory storing the timing pattern and the location; wherein programmable light timer application applies a time associated with the dusk setting or the dawn setting of the timing pattern based upon the location received from the wireless communication device.

A method for implementing a timing pattern on a programmable light timer is also described. The method comprises receiving, using a wireless communication protocol, a timing pattern and a location from a wireless communication device; storing the timing pattern and the location in a memory of the programmable light timer; and applying the timing pattern based upon the location received from the wireless communication device.

BRIEF DESCRIPTION OF THE DRAWINGS

FIG. 14 is a diagram showing data fields of data entered by a user according to an embodiment of the present invention;

FIG. 15 is a diagram showing data fields of data entered by a user according to an alternate embodiment of the present invention;

FIG. 16 is table showing timing pattern codes and associated timing characterization data and categories according to an embodiment of the present invention;

FIG. 17 is a table showing the designation of regions associated with a number of geographical locations according to an embodiment of the present invention;

FIG. 18 is a table showing average dusk and dawn times for various regions and periods according to an embodiment of the present invention;

FIG. 19 is a table showing daylight savings time codes and associated daylight savings time characterization data according to an embodiment of the present invention;

FIGS. 21-43 shows a series of stages of programming a timer using the 5-key user interface of FIGS. 5 and 7;

FIG. 44 is a memory showing fields and stored data associated with the programmed timer of FIG. 43;

FIGS. 45-49 show screens of a user interface enabling the wireless programming of a timer according to an embodiment of the present invention;

DETAILED DESCRIPTION OF THE DRAWINGS

The various embodiments set forth below overcome significant problems with conventional timers of having to use a small display, and navigating a menu on such a small display. Some embodiments eliminate the requirement of having a display by providing pre-programmed timing patterns which can be easily selected by entering a timing pattern code associated with a desired timing pattern. Other embodiments include a display, but benefit from an improved user interface which enables the easy selection of a timing pattern by selecting a desired timing pattern code. In addition to selecting the timing pattern code, the user interfaces for embodiments with or without a display enabling the easy programming of other data which must be entered to operate the timer. By storing the timing patterns which are associated with common or desirable on/off patterns which are likely to be used to operate the timer, a user does not need to enter on/off times for a light for various times during a day or week, or reprogram the timer in response to changes in dusk and dawn times during a calendar year.

Figure 1:
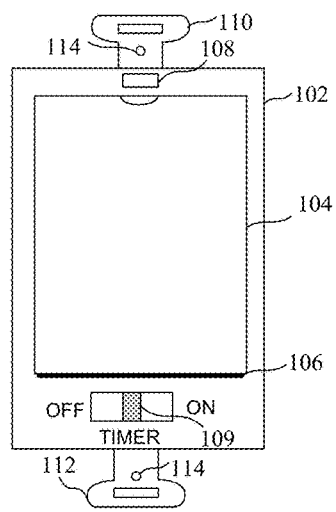
FIG. 1 is a perspective view of a front panel of an in-wall light timer according to an embodiment of the present invention.

Turning first to FIG. 1, a perspective view of a front panel of an in-wall light timer according to an embodiment of the present invention is shown. The timer of FIG. 1 comprises a housing portion 102 having an optional cover 104 (coupled to the timer by way of a hinge 106) which covers a user interface when in the closed position and enables programming the timer by way of the user interface in the open position. A feedback indicator 108, such as a light and more particularly a light emitting diode (LED), could be implemented to show the status of the light or other appliance attached to the timer, for example. The feedback indicator could show green when a light attached to the timer is on, and could be or (or show red) when the light is off. An optional switch 109 which is movable between an on or off position, and a timer position for implementing the timer according to a selected timing pattern. While the cover is primarily cosmetic and may generally prevent unintentional changing of the timer, the timer cover is not necessary. Alternatively, the cover may be functional, such as functioning as an on/off override switch for the light or appliance attached to the timer in place of the switch 109. For example, the state of the light may be toggled (i.e. changed from a current state, such as on, to the other state, such as off) in response to pressing the cover which would activate a switch to change the state of the light if the switch 110 is not included. Flanges 111 and 112, each having a threaded portion for receiving a screw to attach the timer to a junction box. While the various embodiments are generally described in reference to a timer which is "hard wired" in a junction and may be used for a porch light for example, it should be understood that the user interfaces, circuits and methods set forth in more detail below could be implemented in a timer which is plugged into an outlet (commonly called an light or appliance timer), as will be described in more detail below in reference to FIG. 9. Further, while some examples are provided in terms of residential-type in-wall timers which are installed in a conventional residential junction box, it should be understood that the user interfaces, circuits and methods could be implemented in commercial timers.

Figure 2:
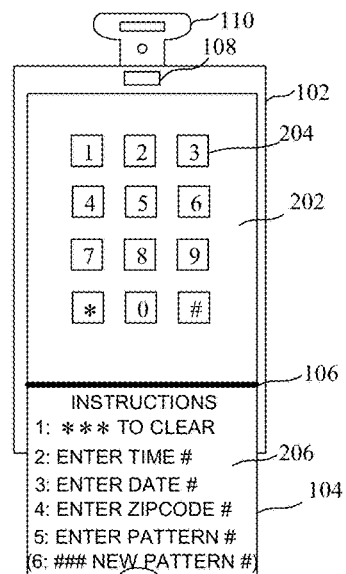
FIG. 2 is a perspective view of the front panel of the in-wall light timer of FIG. 1 with a cover open according to an embodiment of the present invention.

Turning now to FIG. 2, a perspective view of the front panel of the in-wall light timer of FIG. 1 with a cover open according to an embodiment of the present invention is shown. As shown in FIG. 2, when the cover 104 is moved to an open position, a user interface comprising a keypad 204 is accessible on an inner surface 202. Also shown on an inner surface 206 of the cover, instructions can be printed to enable the user to easily program the timer. As will be described in more detail below, a user can program the timer in 5 simple steps (and change a timing pattern using a single step). The keypad 204 of FIG. 2 comprises 0-9 keys and star (*) and pound (#) keys.

According to one embodiment, the timer could be programmed using 5 steps for entering data on the keypad as shown on the inside of the cover. The keypad is used to enter numeric data which is necessary to operate the timer. A key pattern sequence is entered to clear the timer if necessary. For example, the star key could be pressed 3 times to clear the memory. Data necessary to operate the timer according to a user's desired timing pattern is then entered. In particular, a current time is entered followed by the pound key. The pound key may be entered to indicate that all of the data for a given field. Alternatively, all of the data could be considered to be entered after a time-out period. The time is preferably entered as military time (e.g. 2:00 PM would be entered as 1400) to ensure that the correct AM or PM time is stored. Alternatively, a code at the end of the time could be entered to indicate AM or PM. A date is then entered, followed by the pound key. The date is preferably entered as a 6 digit code (e.g. in the DDMMYY format) to ensure that the date is properly interpreted. A location code (such as a zip code) could then be entered followed by the pound key. As will be described in more detail below, the location code can be associated with a region which is used to ensure that the correct daylight savings times and dawn and dusk times (or average values associated with dawn and dusk times) are used to operate the timer. The timing pattern is then entered followed by the pound key. The timing pattern will be used to operate the timer based upon the current time, date and location of the timer. Accordingly, after 5 simple steps, the timer is programmed to follow a timing pattern that meets the user's needs, and operates as it would if on/off times were entered on a user interface in a conventional manner to implement the timing pattern.

In addition to providing simple steps to program the timer, the user interface of FIG. 2 also enables easy reprogramming if desired by the user. Although the selection of a desired timing pattern will eliminate the need to reprogram the timer (such as at the start of spring or fall seasons as is generally required with conventional timers), the user interface enables easy reprogramming is a user decides that they simply want to change the timing pattern. That is, rather than having to clear all of the data and re-enter the current time, date and a zip code, a key sequence could be entered followed by the pound key to change the timing pattern. For example, a user could enter a sequence of three # keys followed by the new timing pattern, followed by the # key. While the use of pre-stored timing patterns which can easily be selected using a timing pattern code, it may be the case that the user may realize that they do not like the pattern that they selected, and decide that they simply want to change the timing pattern that they selected. Alternatively, a user may decide that they want to periodically reprogram the timer. That is, although the use of pre-stored patterns eliminates the need for reprogramming, reprogramming the timer to implement another pre-stored timer is so easy that it is an option for a user of timer implementing the pre-stored timing pattern.

Figure 3:
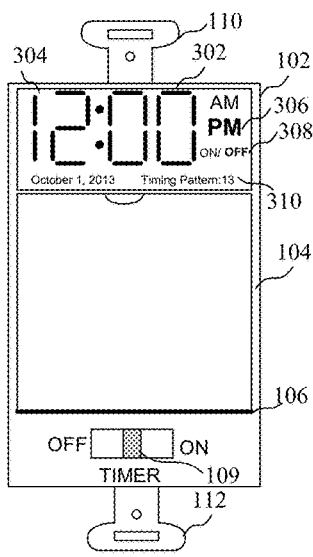
FIG. 3 is a perspective view of a front panel of an in-wall light timer having a display according to another embodiment of the present invention.
Figure 4:
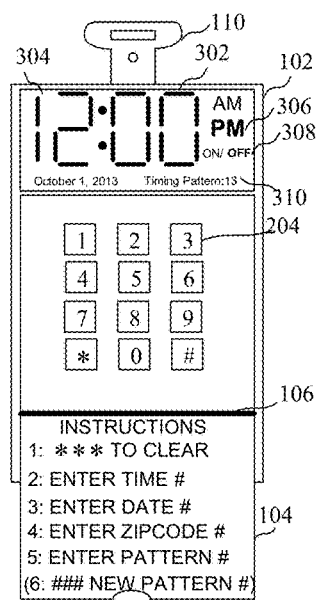
FIG. 4 is a perspective view of the front panel of the in-wall light timer of FIG. 3 with a cover open according to an embodiment of the present invention.

Turning now to FIG. 3, a perspective view of a front panel of an in-wall light timer having a display according to another embodiment of the present invention is shown. According to the embodiment of FIG. 3, a display 302 could be implemented. While a display may not be necessary to implement the timer with pre-stored timing patterns, the display may be desirable to provide information regarding stored data, including a selected timing pattern for example. That is, even though a display is not necessary in view of the use of pre-stored timing patterns, a user may desire a display for aesthetic reasons, because they are simply used to having a display, or for what information it does provide. As shown in FIG. 3, the display includes a time field 304 which displays the current time during normal operation, an AM/PM field 306, an on/off field 308 indicating the state of a light or appliance which is attached to the timer. Finally, an information field 310 includes other information related to the operation of the timer. For example, the information field could include the current date and the timing pattern number. The timing field could include other information, such as DST code or whether a security code is used, as will be described in more detail below. Based upon the current time, date and security code information, a user could determine whether the timer is set with the correct data and should be operating correctly. As shown in FIG. 4 which shows the embodiment of FIG. 3 with the cover in the open position, the user interface could be implemented in with the user interface.

Figure 5:
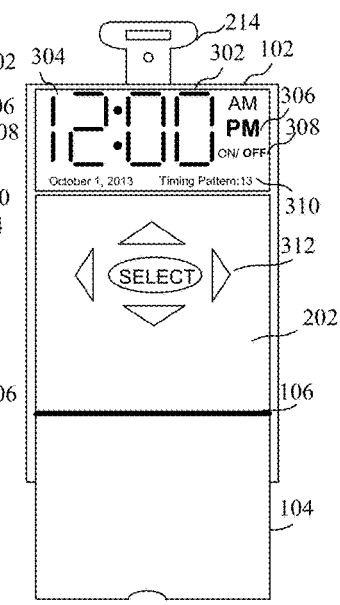
FIG. 5 is a perspective view of the front panel of the in-wall light timer of FIG. 3 with a cover open according to another embodiment of the present invention.

Turning now to FIG. 5, a perspective view of the front panel of the in-wall light timer of FIG. 3 with a cover open according to another embodiment of the present invention is shown. According to the embodiment of FIG. 5, a 5-key user interface could be implemented to enter data necessary for implementing a timer using a pre-stored timing pattern. As will be described in more detail below in reference to FIG. 20, the left and right keys on either side of a select key will allow a user to traverse through programming categories, while the up and down keys above and below the select key will enable a user to move through the available options in a given programming category. As will be further described below, the 5-key user interface will be enable a user to select a timing pattern code so that the timer can be implemented with a pre-stored timing pattern.

Figure 6:
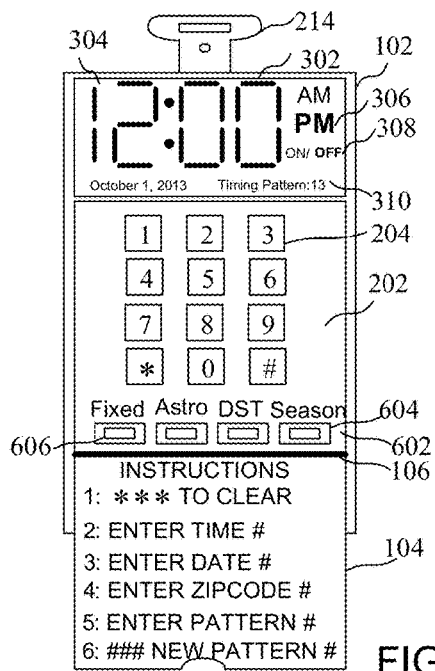
FIG. 6 is a perspective view of the front panel of the in-wall light timer of FIG. 3 having preset buttons according to an embodiment of the present invention.

Turning now to FIG. 6, a perspective view of the front panel of the in-wall light timer of FIG. 3 having pre-set buttons according to an embodiment of the present invention is shown. As shown in FIG. 6, dedicated, pre-set actuators 602, shown here as buttons 604 which enable the manual selection of a pre-stored timing pattern. Four pre-set buttons are shown in the embodiment of FIG. 6, including a fixed button (applying a fixed on time and fixed off time when selected), an astronomic button enabling the operation of the timer based upon astronomic data, a DST button enabling the operation of the timer based upon a first timing pattern for a standard time period and a second timing pattern for a daylight savings time period, and a seasonal button for applying different timing patterns for each of the four seasons. Each of the buttons includes a selection indicator (such as an LED light for example) which would indicate when the button is selected. The button could be movable between a depressed, on position (where it is flush with the surface of the timer and the LED lit) and an off position. Alternatively, the selected button would have the LED lit, with all buttons having the same positioning. Only a single button can be selected at a time, where a selected button would be deactivated if another button is selected. The selection of timing patterns for the pre-set actuators 602 will be described in more detail below. While 4 buttons are shown, it should be understood that a greater number of buttons or fewer buttons could be implemented. Further, while examples of the functions of buttons are shown, it could be understood that other functions for the pre-set buttons could be implemented. For example, one button could be dedicated to each season. As will also be described in more detail below, a wireless option would enable the wireless programming of timing patterns for the pre-set buttons.

Figure 7:
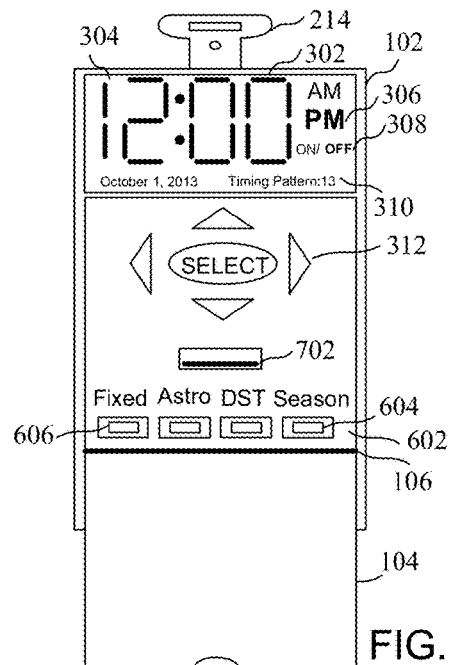
FIG. 7 is a perspective view of the front panel of the in-wall light timer of FIG. 3 having preset buttons according to another embodiment of the present invention.

Turning now to FIG. 7, a perspective view of the front panel of the in-wall light timer of FIG. 5 according to another embodiment of the present invention is shown. In addition to having pre-set buttons as shown in FIG. 6, a connector 702 for receiving a portable memory device is provided for downloading data, such as new or different timing patterns or DST data, as will be described in more detail below. While the connector for receiving a portable memory is only shown in connection with FIG. 7, it should be understood that such a connector could be implemented in any of the embodiments of FIGS. 1-6.

While user interfaces are provided in the embodiment of FIGS. 6 and 7 for entering data in addition to the dedicated buttons for selecting a predetermined timing pattern, it should be understood that the embodiments of FIGS. 6 and 7 could be implemented without the user interface for entering data or a display, where the only actuators which would be required for selecting a timing pattern would be the dedicated buttons of FIGS. 6 and 7 for selecting pre-stored timing pattern or a timing pattern based upon data selected for the buttons and provided to the timer. That is, the timing patterns of the dedicated buttons could be assigned defined, pre-stored timing patterns, could be downloaded using a portable memory by way of the connector 702, or could be programmed by a user, as will be described in more detail below in reference to FIGS. 46-49. That is, embodiments of the timer could be implemented with the pre-set buttons 602, and not having a keypad 204 or a 5-key interface 312.

Figure 8:
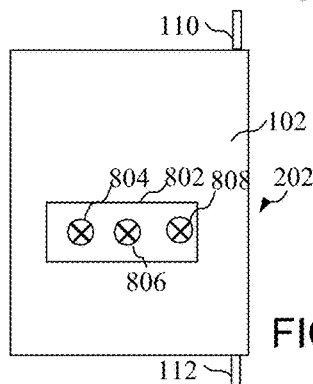
FIG. 8 is a side view of the in-wall timer enable a connection of the timer to electrical wiring.

Turning now to FIG. 8, a side view of the in-wall timer shows connectors enabling a connection of the timer to electrical wiring. The side view of the timer shows a connector panel 802 having coupling elements 804-808, shown here as screws, for receiving wires of a junction box. Alternatively wires could extend from the timer and be connected to wires of the junction box.

Figure 9:
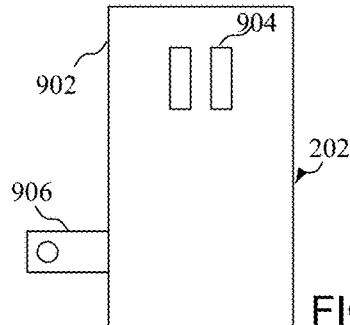
FIG. 9 is a side view of a timer having a front panel according to FIGS. 1-7 and adapted to be implemented with a wall outlet according to an embodiment of the present invention.

Turning now to FIG. 9, a side view of a timer having a front panel according to FIGS. 1-7 and adapted to be implemented with a wall outlet according to an embodiment of the present invention is shown. Rather than a timer which is fixedly coupled to a junction box, the various circuits and methods can be implemented in a timer adapted to be used with a wall outlet and adapted to receive a plug of a light or some other appliance. As shown in FIG. 9, the timer 902 comprises a receptacle 904 for receiving the prongs of a plug of a light or an appliance. The timer 902 also comprises prongs 906 to be inserted to an outlet to enable applying power to the light or appliance. The user interface 202, shown opposite of the prongs 906, can be implemented according to any of the user interfaces set forth above.

Figure 10:
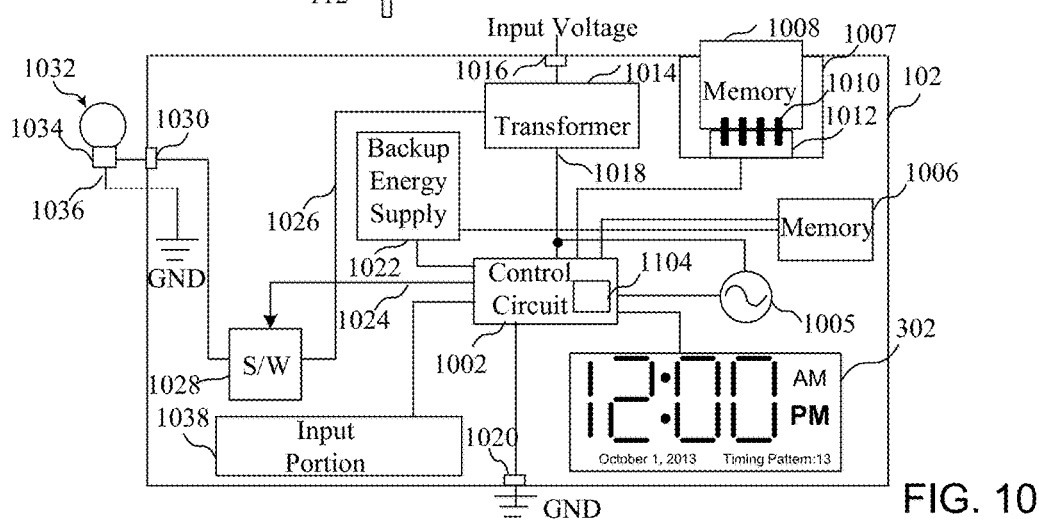
FIG. 10 is a block diagram of a circuit enabling the operation of the embodiments of FIGS. 1-9 according to an embodiment of the present invention.

Turning now to FIG. 10, a block diagram of a circuit enabling the operation of the embodiments of FIGS. 1-9 according to a first embodiment of the present invention is shown. As shown in FIG. 10, a circuit for implementing a timer having pre-stored timing patterns comprises a control circuit 1002 adapted to access one or more of a plurality of pre-stored timing patterns. The control circuit 1002 may be a processor having a cache memory 1004 storing timing patterns and other data necessary to implement the timer. A memory 1006 may also be implemented to store timing patterns or other data necessary to implement the timer. The memory 1006 may be implemented as a non-volatile memory, enabling the memory to store the timing patterns and data without loss due to a power loss. A portable memory 1008, having contacts 1010, may be received by a connector 1012 (such as the connector 702 of FIG. 7 for example) and coupled to corresponding contacts. A transformer 1014 is coupled to receive an input voltage at an input 1016, and provide a regulator voltage signal 1018 to various elements of the timers. A second input 1020 is coupled to a ground terminal enabling a ground signal which is coupled various elements of the timer. A backup energy supply 1022, which could be a battery or a capacitor for example, could be implemented to ensure that data of a memory is not lost during a loss of power. The control circuit provides a control signal by way of signal line 1024 to a switch 1028 which receives a regulated voltage by way of a line 1026. The switch 1026 controls the application of the regulated voltage to a voltage terminal 1030 which enables power to be applied to an appliance 1032, such as a light as shown. The appliance has a first terminal 1032 for receiving the regulated voltage from the voltage terminal 1030 and a second terminal 1036 coupled to the ground potential. An input portion 1038, which may be implement any of the user interface elements described in reference to FIGS. 1-7 is also shown.

Figure 11:
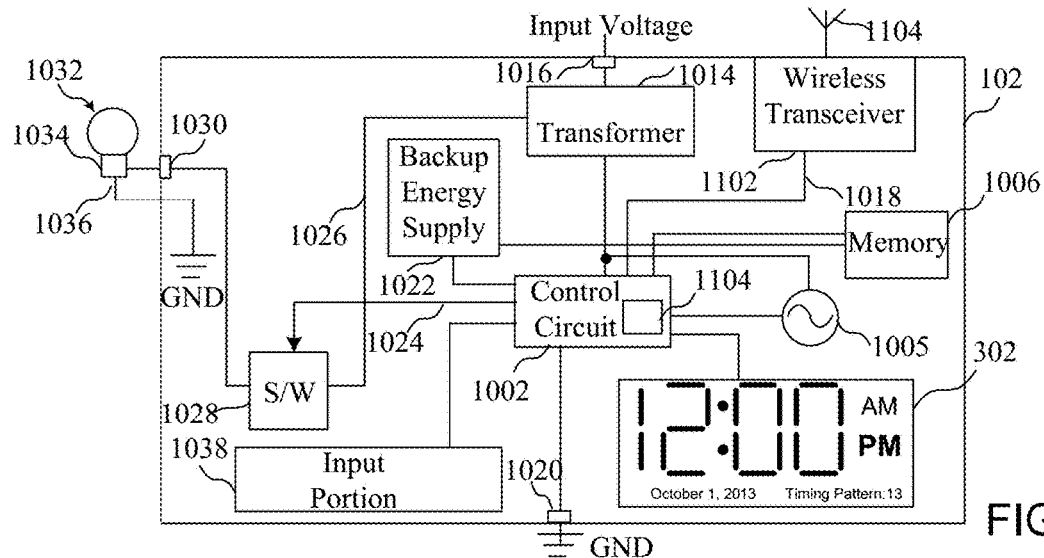
FIG. 11 is a block diagram of the a circuit enabling the operation of the embodiments of FIGS. 1-9 having a wireless communication circuit according to an embodiment of the present invention.

Turning now to FIG. 11, a block diagram of the a circuit enabling the operation of the embodiments of FIGS. 1-9 having a wireless communication circuit according to an embodiment of the present invention is shown. As shown in FIG. 11 comprises a wireless communication circuit 1102 which is adapted to enable the wireless programming of certain data or information by way of a corresponding wireless communication circuit implemented in a computer device, such as a laptop computer, a tablet computer or a "smart phone." An example of a wireless communication circuit is shown by way of example in FIG. 12.

Figure 12:
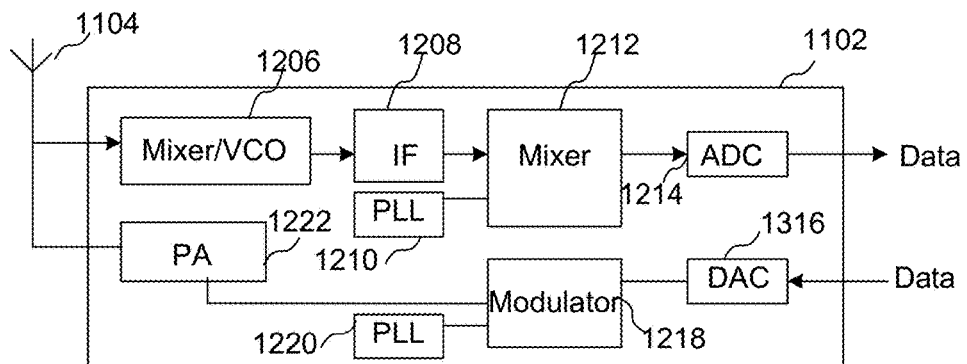
FIG. 12 is a block diagram of an exemplary wireless communication circuit enabling the operation of the circuit of FIG. 11 according to an embodiment of the present invention.

Turning now to FIG. 12, a block diagram of an exemplary wireless communication circuit enabling the operation of the circuit of FIG. 11 according to an embodiment of the present invention is shown. In particular, the antenna 1104 receives wireless communication signals according to a predetermined wireless communication protocol. The data may be sent to the wireless transceiver 1102 by way of a computer having or in communication with a corresponding wireless transceiver 1102. The received data is coupled to a combined mixer/voltage controlled oscillator 1206, the output of which is coupled to an intermediate frequency (IF) circuit 1208. Based upon outputs of the IF circuit and a phase locked loop (PLL) 1210, a mixer 1212 generates the received data. An analog-to-digital converter (ADC) 1214 then generates digital data representing the timing characterization data.

The control circuit may also provide data to the data transceiver for transmission to the computer. Data to be transmitted from the data transceiver 1102 is coupled to a digital-to-analog converter (DAC) 1216, the output of which is coupled to a modulator 1218 which is also coupled to a PLL 1220. A power amplifier receives the output of the modulator to drive the antenna 1104 and transmit the data. It should be noted that the wireless communication network could be configured to implement any wireless protocol for communicating with the wireless communication circuit of the timer of FIG. 11. According to one embodiment, the data transceiver could implement the IEEE Specification 802.11 wireless communication standard, the Bluetooth standard, an infrared protocol, or any other wireless data protocol. While the circuit of FIG. 12 is provided by way of example, other wireless data transceivers could be employed according to the present invention to implement the desired wireless communication standard.

Figure 13:
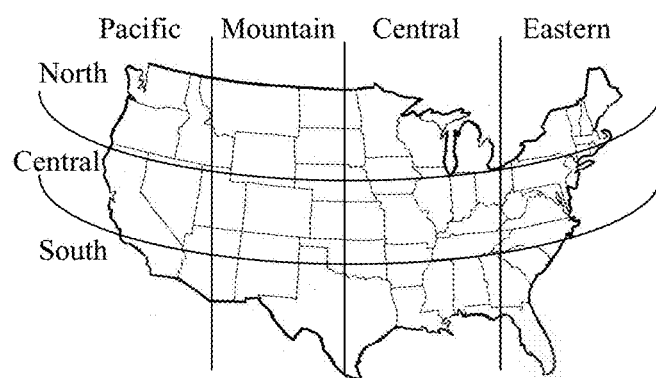
FIG. 13 is a segmented map showing geographic regions of operation for a timer according to an embodiment of the present invention.

Turning now to FIG. 13, a segmented map showing geographic regions of operation for a timer according to an embodiment of the present invention is shown. The geographic regions enable applying certain data, such a timing pattern, which is suitable for a timer implemented in the geographic area. As shown in FIG. 13, the geographic area of the continental US is divided into 12 regions identified by a longitudinal designation (shown here as the time zones) or latitudinal designation (shown here as 3 regions designated as north, central and south). According to the embodiment of FIG. 13, the regions are designated by a two letter code including the first letter of the longitudinal code followed by the first letter of the latitudinal code, by way of example. While 12 regions are shown by way of example, it should be understood that a greater number or fewer number of regions could be designated. Further, while geographic regions, other designation of regions could be implemented, such as zip codes or telephone area codes.

Figures 14, 17, 19:
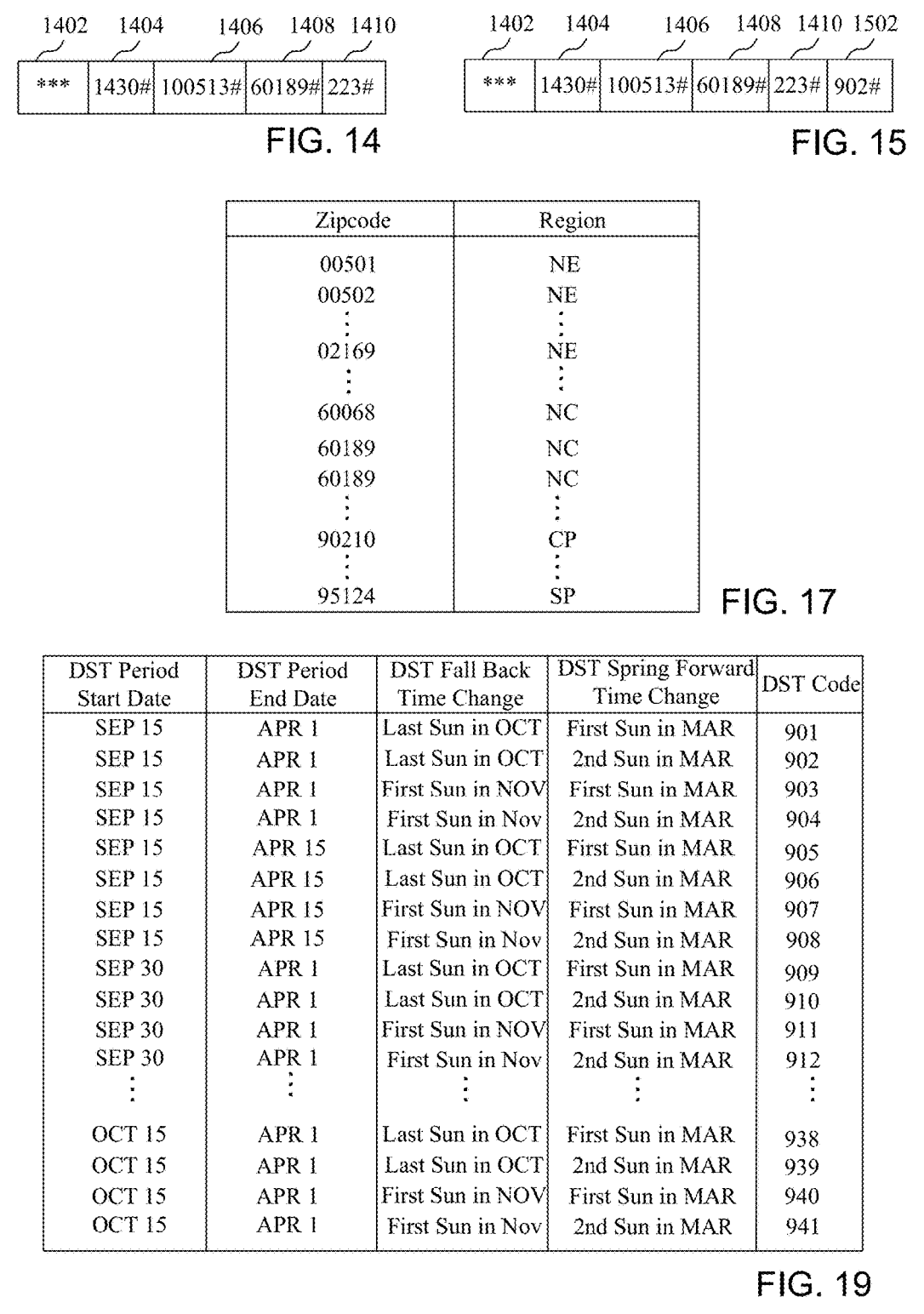

Turning now to FIGS. 14 and 15, diagrams data fields of data entered by a user according to embodiments of the present invention, including data as entered on a keypad as described in reference to FIG. 2. According to the embodiment of FIG. 14, a field 1402 stores the received "clear" code, shown here as three star keys, a time code 1404 (shown here as a 4 digit time entered in military format representing 2:30 PM), a date code 1406 (shown here as a 6 digit date in the DDMMYY format), a location code 1408 (shown here as a zip code), and a timing pattern code 1410 (which will be described in more detail below). While the location is shown as a zip code, other location codes representing larger or smaller geographical errors could be utilized. According to the embodiment of FIG. 15, an optional daylight savings code 1502 indicating daylight savings time information, such as dates associated with a period for applying a daylight savings time pattern or dates for shifting the current time by 1 hour, as will be described in more detail below. While specific codes are shown in FIGS. 14 and 15, it should be understood that additional fields could be implemented.

Turning now to FIG. 16, a table shows timing pattern numbers and associated timing characterization data and categories according to an embodiment of the present invention. A significant benefit of the various embodiments of the timers and methods of implementing a timer is that on and off times for implementing a timer are easily selected without having to enter the on and off times. Rather, a timing pattern designated by a timing pattern code can be easily be selected by a user rather than having a user enter the on and off times for the timer. As will be described in more detail below, the timing patterns can be categorized according to a number of broad categories, such as fixed timing patterns, DST timing patterns, seasonal timing patterns, and astronomic timing patterns, for example, to make it easier to select a desired timing pattern. The timing pattern codes can also be arranged such that similar timing patterns can have similar numbers, and can be arranged in a tree format such that numbers having the same most significant bit will have the same broad category. Timing patterns associated with timing pattern codes having the same second most significant bit may also have a common on or off time, for example.

Referring specifically to FIG. 16, timing patterns are shown for fixed timing patterns, DST timing patterns, seasonal timing patterns, and astronomic timing patterns, where the fixed timing patterns having timing pattern codes between 1 and 1xx, DST timing patterns having timing pattern codes between 2 and 2xx, seasonal timing patterns having timing pattern codes between 3 and 3xx, and astronomic timing patterns having timing pattern codes between 4 and 4xx. The fixed time year-round timing patterns as shown have an on time and an off time, where timing pattern codes associated with timing patterns having the same on time have the same first two digits. For example, timing patterns having an on time of 4:00 PM will have a timing pattern code starting with 11X, while timing patterns having an on time of 5:00 PM will have a timing pattern code starting with 12X. The first timing pattern code of any of the any of the groups (i.e. the timing pattern code could be the default timing pattern code for dedicated timing pattern selection buttons as will be described in more detail below.

The second and third timing pattern categories have different timing patterns for different times of the year. In particular, the DST category has two timing patterns, one for standard time and one for daylight savings times, where the different timing pattern codes represent various combinations of on and off times for both of the standard time and daylight savings time. Similarly, the seasonal category has different on and off times for each of the four seasons.

Finally, the astronomic category of timing patterns including timing patterns based upon known dusk and dawn times. While dusk and dawn times are helpful in setting on and off times for a timer because they are close to the times when it becomes dark and light, the use of the known dusk and dawn times often leads to the timer being on at times when a user may not want the timer on. For example, during winter, lights may come on before 4:00 PM, which may be much earlier than desired. Similarly, lights may be on later than desired at dawn. During summer, lights may be on later than desired, which may be after 7:30. Therefore a user may want to use an offset. As will be described in more detail below, a certain time period delay for tuning on the timer may be desired with on times and a certain time period for turning lights off early may be desired with off times. Further, a user may desire the use of astronomic dusk times (with or without an offset) and the use of a fixed timer for turning the lights off at some time after midnight, for example. It should be understood that astronomic dusk and dawn times could be used with timing patterns in the DST and seasonal categories, or could be limited to the astronomic categories for simplicity. It should also be noted that while even hour times are shown, on and off times based upon half hours or quarter hours could be provided.

In order to implement astronomic times, it is necessary to consider both locations and the time of year. While it may be possible to store astronomic data any level of granularity of location and time, average astronomic dusk and dawn data could be stored based upon a particular region and a particular time period as will be described in reference to FIG. 18. In order to store average astronomic dusk and dawn data, it is necessary to identify a location where the timer will be used, and assign that location to a reasonable number of regions for which astronomic timing data is stored. By way of example in FIG. 17, the 12 regions designated in FIG. 13 could be associated with zipcodes. Accordingly, when a user enters a zip code, data associated with the region having the zip code would be used when implementing a selected timing pattern for the timer. By way of example, the data could be based upon a central location of the region, or an average of the different dusk and dawn times of the region. Alternatively, the average dusk and dawn times could be skewed toward more populated areas of the regions. Not only would average dusk and dawn times for the location be used based upon the zip code, but the correct time in the various time zones based upon the Greenwich Mean Time (GMT) would also be used. Alternatively, three digit telephone area codes could be used.

As shown in FIG. 18, these average dusk and dawn times are not only based upon location, but also based upon time of year. While daily dusk and dawn times could be used, it would be more efficient to use average dusk and dawn times for given time periods, and particularly time periods associated with time periods for implementing timing patterns, as described in reference to FIGS. 51 and 52. Accordingly, for each region, an average dusk time and average dawn time for different timer periods during which a particular on time or off time would be applied, shown by way of example in FIG. 8 to include a full year, portions of a year or individual days.

Additional data which could be used in implementing a timer is DST data and corresponding DST codes. In addition to dates at which times are moved back during the fall or moved back during the spring in areas having daylight savings times (where these dates have changed over time and may change in the future), dates for applying a timing pattern for a period having shorter daylight, called a daylight savings time period. While the daylight savings time period could correspond to the times for moving the timer forward and back, a user may like to select a period for applying a daylight savings time timing pattern during a period which is different than the period between moving the clock back and returning the clock to the standard time. Accordingly, a table could be stored which has different daylight savings time data including a DST time period for applying different timing patterns and dates for changing the clock. Each of a plurality of combinations is stored with a corresponding DST code in the table. When the DST code is entered during programming of the timer, on and off times associated with a selected timing pattern will be applied subject to dates and times associated with daylight savings time data associated with the DST code.

It should be noted each of the tables 16-19 are stored in a memory of the timer, such as memory 1006 or a cache memory of the timer of FIG. 10. The data is preferably stored at the time of manufacture (or at some point before the timer is packaged) and provided to the end user with the timing patterns selectable by a timing pattern code already stored in the memory. Further, data in the tables could be updated using a portable memory device, such as a USB drive, by way of the connector 702.

Figure 20:
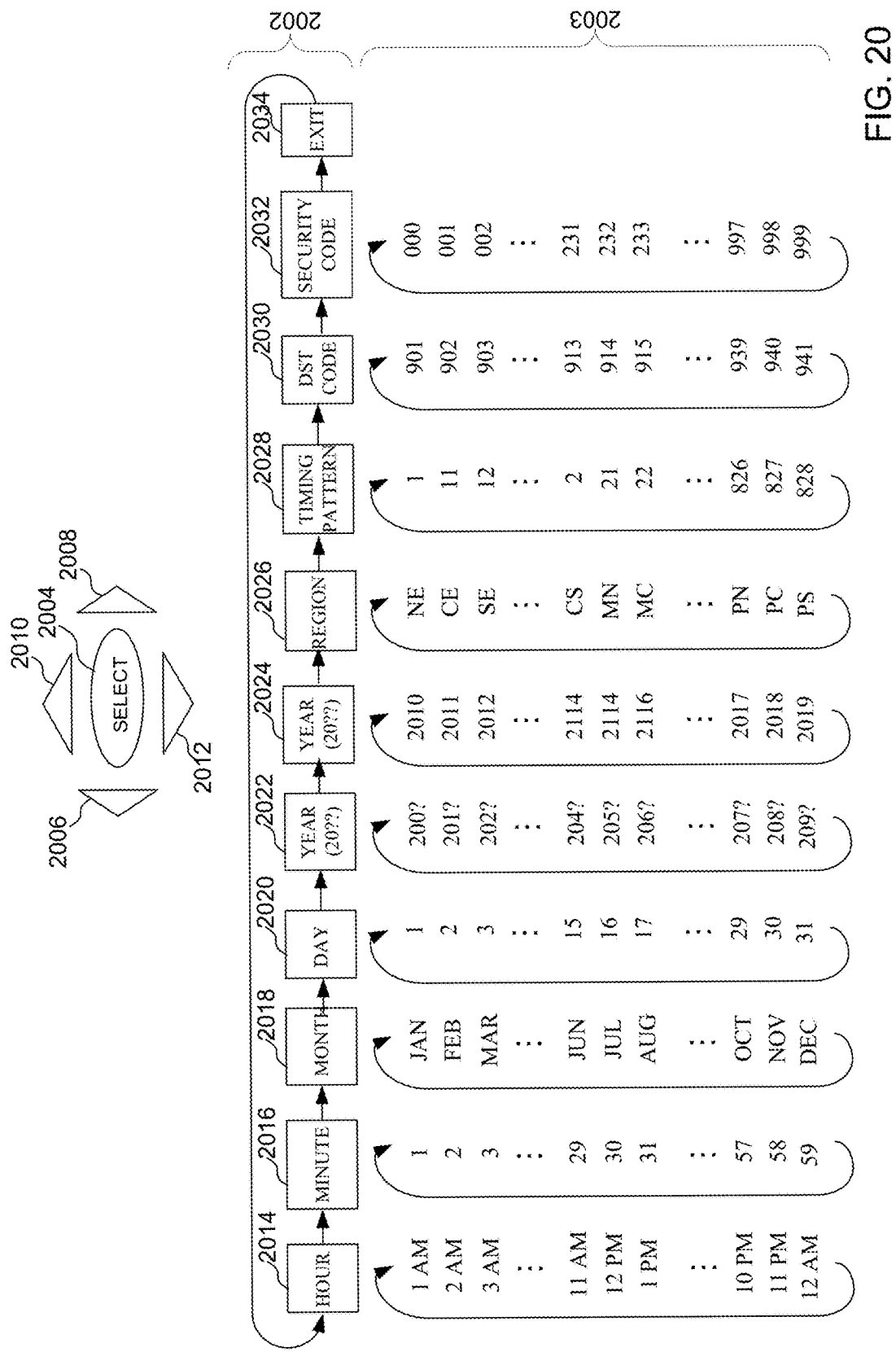
FIG. 20 is a flow diagram showing the operation of the 5-key user interface of FIGS. 5 and 7 according to an embodiment of the present invention.
Figure 46:
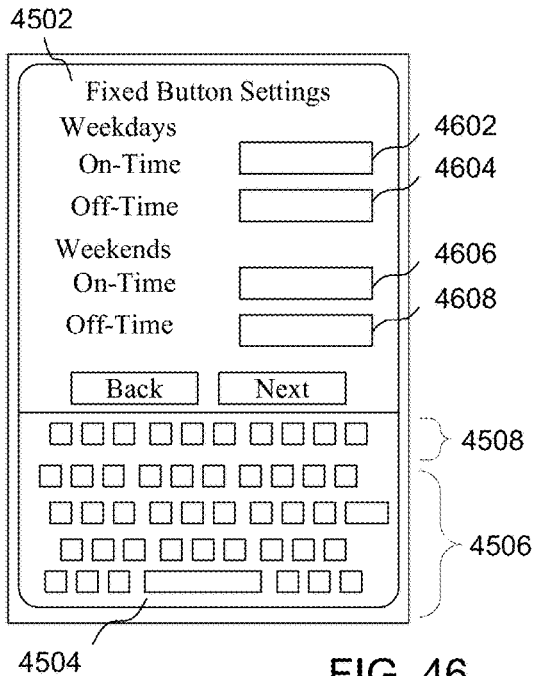

Turning now to FIG. 20, a flow diagram shows the operation of the 5-key user interface of FIGS. 5 and 7 according to an embodiment of the present invention. While the keypad of FIG. 2 provides an easy way of entering data necessary to implement a timer having pre-stored timing patterns, other user interfaces could be used which take advantage of the pre-stored timing patterns associated with corresponding timing pattern codes. For example, "navigation" keys which enable a user move through a menu can be implemented to enable a user to select a timing pattern code or any other data necessary for implementing a timer as set forth above. Unlike conventional timer user interfaces, the 5 key navigation user interface of FIG. 20 is not only intuitive, but overcomes many of the problems associated with conventional user interfaces by not only showing a current programming category and a current data value for the current programming category, but also previous and following programming categories and previous and following data values which could be selected for the current programming category. That is, as will be described in more detail in reference to FIGS. 21-43, the arrangement of programming categories and corresponding data values will enable easy navigation through the user interface by indicating where a user is within the menu.

Referring specifically to FIG. 20, the programming categories 2002 and corresponding data values 2003 could be selected by the 5 key user interface which includes a select key 2004 which could be used to select data associated with a given programming category. In summary, the select key 2004 will enable a user to enter the menu for programming (such as by depressing the key for a predetermined period (e.g. 2 seconds), the left key 2006 will allow moving left along the programming categories, and the right key 2008 will enable moving right along the programming categories. An up key 2010 will enable a user to move up within a column for a current programming category, while a down key 2012 will enable moving down within the current programming category. By way of example, when the display is in an operational mode and shows operational values (such as the operational values shown in FIGS. 3-5), the first programming mode (i.e. the hour programming mode 2104) will be shown on the display when the select key 2004 is selected. If the user desires to enter a certain time, the up and down keys can be used to move to a desired data value representing the desired hour, and have that data value selected by using the select key. When a data value is selected for a given programming category, the user interface preferably then automatically moves to the following programming category. A key pad sequence (such as the selection of the select key three times or merely holding the select key for a predetermined period of time (e.g. 2 seconds)) can then be entered at any time to leave the programming mode of the timer.

The programming categories include the following: the hour mode 2014 (having 24 data values from 12 AM to 11 PM), the minute mode 2016 (having 60 data values from 0 to 59 minutes), the month mode 2018 (having 12 data values from JAN to DEC), the day mode 2020 (having 31 data values from 1 to 31), the year mode 2022 (having 10 data values for each of the tens digit of the year from 0x to 9x), the year mode 2024 (having 10 data values from 0 to 9 for the one's digit), the region mode 2026 (having 12 data values for each of the regions shown in FIG. 13), the timing pattern mode 2028 (having a predetermined number of timing pattern codes associated with a corresponding number of pre-stored timing patterns), the DST mode 2030 (having the number of data values associated with different DST data values, such as the data associated with the DST codes of FIG. 19), the security mode 2032 (having the number of available security codes, such as 100 codes for a two bit security code or 1000 codes for a 3 bit security code), and optionally an "exit" programming option which will be described in more detail in reference to the programming example of FIGS. 21-43. While a user can depress and hold the select key for a predetermined period of timer for example to leave the programming mode, the exit option can also be provided to enable a user to leave the programming mode. In either case, a new data that has been selected will be stored and used by the processor of the timer to implement a timing pattern.

FIGS. 21-43 shows a series of stages of programming a timer using the 5-key user interface of FIGS. 5 and 7. While displays may be desirable for some users (because they want to see what data is being entered to program the timer), conventional timers having displays are not only difficult to navigate through a menu for programming the timer (and understand where the user is in the menu), but also are difficult to see the data which is entered in a certain field of a conventional timer because the display is so small. The displays of FIGS. 21-43 show the steps of programming a timer to enable operation of the timer according to a pre-stored timing pattern from the initial, un-programmed state of the timer of FIG. 21 to the final programmed state of the timer of FIG. 43. As shown in FIG. 21, various fields which provide information in the normal operating state are shown. The programming mode can be entered when the select key of the 5-key user interface is selected (or some other key sequence such as the select key being selected 3 times, or the select key being depressed for a predetermined period, such as two seconds).

One unique feature of the user interface described in FIGS. 21-43 is that a current selection option (either programming categories or data values) is not only shown, but a "previous" and "next" programming category and data value is also shown. In order to further make the timer easier to program and overcome a significant problem of conventional timers with displays which are difficult to read, the current programming category and data value is larger than the "previous" and "next" programming category and data value. Making the current programming category and data value larger makes it easier to read the programming category and data value while still making it easy to navigate the menu by providing previous and next values.

After a key or key sequence is entered on 5-key user interface to enter the programming mode, an initial programming state is entered as shown in FIG. 22. While the initial states for data values in FIGS. 23-42 are shown as the top values of the available data values for a programming mode, the initial states could be some other value, such as a value near the middle of the available data values, or a commonly selected data value. The sequence of FIGS. 21-42 are intended to show the programming of a timer having the following data: a current timer of 10:24 PM and a current data of Oct. 9, 2013, where the timer is operated in the North Central (NC) region having a timing pattern 13, a DST code 903 and an optional security code 013. As will be described in more detail below, a security code could be used if a user could reprogram the timer using a wireless connection to prevent a hacker from changing the operation of the timer (from outside of a building for example).

As shown in FIG. 22, the initial programming state includes the Hour programming mode, and a initial data value of 1 AM. A user could then use the up and down keys to select the desired time. As shown in FIG. 23, the user had moved down one data value to 2 AM, and then down to the desired data value of 10 PM as shown in FIG. 24. When the user reaches the desired data value, the user can select the value using the select key, in which case the display would then display the next programming category, which happens to be the minute programming category. Alternatively, rather than automatically changing, a user could be required to move to the next programming category by selecting the right arrow key. As shown in FIG. 25, the initial state of the minute programming mode has a "1" in the data value display portion. The up and down keys can then be used to move to the desired "24" minute data value as shown in FIG. 26, where the month programming category would then be displayed as shown in FIG. 27 in response to the selection of the data in the minute programming mode. After the desired month of October is reached in FIG. 29, the programming mode is move to the day programming mode as shown in FIG. 29, where the desired 24th day is selected as shown in FIG. 30. As shown in each of the displays, a previous programming category is shown above a current programming category, and a next programming category is shown below the current programming category. Similarly, a previous data value of the current programming category is shown above the current data value, and a next data value is shown below the current data value. For example, in selecting the month as shown in FIG. 27, the previous programming category "minute" in the programming category side of the display is above the current programming category "month," while the next programming category "day" is shown below the current programming category. Similarly, in the data value side of the display, the month of December is above the current data value of January, while the month of February is below the current value. Providing categories and values above and below current categories, a user can more easily navigate through the menu. Also, by providing the current category/value in a larger size, it is easy to read the category/value.

Selecting a desired year can present more of a problem because of the number of available years (e.g. 100 data values from 2000-2099). While a single year selection mode can be implemented in the same way as selecting 1 of 31 days of a month as described above, the year programming mode can be divided into two operations, enabling the selection of a decade in one step and enabling the selection of a year in another step. As shown in FIG. 31, it should be noted that the initial state is shown with a year "200?", where the "zeros" decade is provided. The user can then move down one data value to the "tens" decade as shown in FIG. 32, which, when selected, will lead to the menu option as shown in FIG. 33 enabling the selection of the year for the tens decade. Therefore, the up and down keys are used to select 2013 as shown in FIG. 34.

Other data for implementing the timer can then be entered. In particular, the region in which the timer is implemented can be selected by going from an initial region option NE as shown in FIG. 35 to desired timing region option of NC as shown in FIG. 36. The desired timing pattern can then be selected, where an initial timing program 1 shown in FIG. 37 can be changed to the desired timing program 13, as shown in FIG. 38. The desired daylight savings time code can then be selected, where an initial daylight savings time code 900 shown in FIG. 39 can be changed to the desired daylight savings time code 903, as shown in FIG. 40. Finally, a desired security code can then be selected, where an initial security code of 000 shown in FIG. 41 can be changed to the desired security code of 013, as shown in FIG. 42. After all of the data is entered, and the exit option is selected, the display of the timer returns to the operating mode, where the display shows some or all of the data (other than a value of a security code which could also be shown) entered during programming. Further, a "key" or "lock" icon could be shown on the display to indicate that a security code has been programmed.

While it is assumed that no data was programmed initially, it should be noted that, if the timer is already programmed and just some data needs to be reprogrammed, the left and right keys can be used to move within the menu to reach a desired programming category to change the data for that category, at which time the select key can be used to select the data, leave the programming mode, and return to the display for the normal operational mode. By way of example, if a timer is already programmed and a user desires to change the timing pattern (by changing the selected timing pattern code), a user would enter the programming mode and use the left and right keys to move along the programming modes until the timing pattern programming mode is reached. The up and down the available data values until the desired timing pattern code is reached. The data value be selected by using select key, at which time the programming category would move to the next programming category. If no other data values need to be changed, a user could move along the programming categories to the "exit" option to return to normal operation or hold the select key for a predetermined period of time. Accordingly, if a timer is already programmed and a user desires to change the timing pattern for example, the user can easily change the timing pattern without having to reprogram anything else.

Turning now to FIG. 44, a memory shows fields and corresponding stored data associated with the programmed timer of FIG. 43. All of the data entered using the numeric keypad or 5-key user interface is stored in memory fields of a memory of the timer, such as memory 1006 for example, and is accessed by the timer to implement a selected timing pattern in operating the timer as described above.

Turning now to FIGS. 45-49, screens of a user interface enabling the wireless programming of a timer are shown according to an embodiment of the present invention. That is, based upon a current time and date, the timer will implement the timing pattern (associated with the selected timing pattern code) by using data of FIGS. 16-19. As shown in FIG. 45, a display 4502 of a wireless device, such as a laptop computer, a tablet computer or a cellular telephone having a touch screen or some other data entry element, shows a data entry screen enabling a user to enter the necessary data, including a timing pattern code associated with a desired timing pattern, for implementing the timer. The display also includes a data entry element 4504, shown here as a touch screen entry portion having an alphabetical entry portion 4506 (such as a "QWERTY" keypad) and a numeric entry portion (having touch screen keys from 0 to 9). Various fields are provided to enter the data stored in the memory of FIG. 44. For example, a field 4509 enables a user to enter a security code. The security code may be concealed as shown to avoid someone seeing the code. A time field 4510 enables someone to enter the time, shown here as a 4 digit military time. However, because a full QWERTY keypad is provided, the time could be entered as 10:24 PM for example. The date is entered in a date field 4512. Although shown in a 6 digit DDMMYY format, it could be spelled out using letters and numbers. The desired region, timing pattern and DST code could be entered in fields 4514, 4516, and 4518, respectively. The user could then exit or opt to enter an advanced options mode.

According to one embodiment, the advanced options mode enables a user to select timing patterns to be implemented with the dedicated buttons for selecting timing patterns as shown in FIG. 6 or 7, or enables entering on and off times to be applied when the timing pattern associated with the dedicated buttons are selected. That is, a screen could have a field for each dedicated button, where a user could enter the timing pattern code in the field which corresponds to the timing pattern which is desired for the field. As shown for example in FIG. 46 which relates to a timing program for a fixed button setting, on and off times which would be applied throughout the year could be entered in data fields, where on and off times for weekdays could be entered in fields 4602 and 4604 respectively, and on and off times for weekends could be entered in fields 4606 and 4608 respectively. "Back" and "Next" selection options enable the user to move through the advanced programming options to finish the programming or exit as desired.

Figure 47:
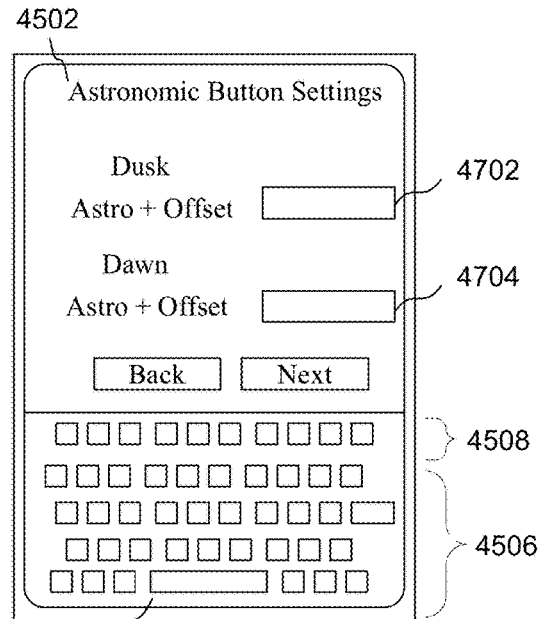

As shown in FIG. 47, on and off times associated with an astronomic mode of operation applied in response to the selection of the "Astro" button can be entered in fields 4702 and 4704, where the entries enable the selection of an offset. As will be described in more detail below in reference to FIG. 50, users may prefer to apply astronomic times with a delay in turning the lights on at dusk, and turning the lights off early at dawn. According to another embodiment, the astronomic timing program associated with a button could include an option of setting the off time to a fixed time. That is, while users may want the on time of the timer to follow the dusk time, they may want the lights to go off at a fixed times (such as 1:00 AM or 6:00 AM for example) rather than be tied to the dawn time.

Figure 48:
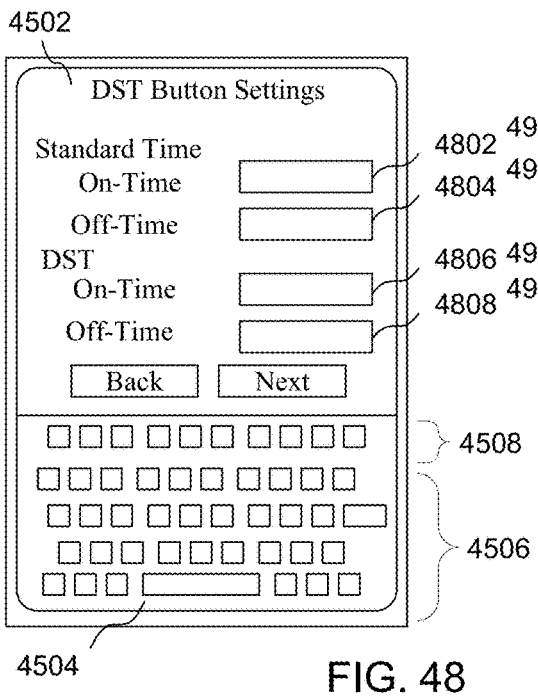
Figure 49:
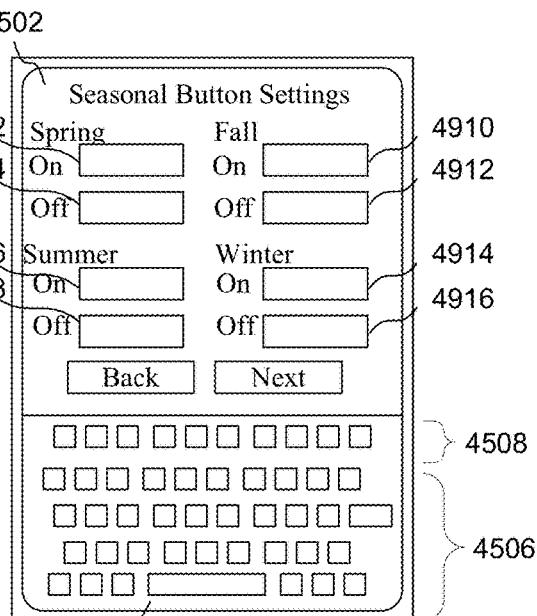

A screen for programming on and off times for a DST button is shown in FIG. 48. According to the embodiment of FIG. 48, on and off times to be applied during a standard time period can be entered in fields 4802 and 4804, while on and off times to be applied during a daylight savings times period can be entered in fields 4806 and 4808. A similar arrangement is shown in FIG. 49, where settings for 4 "seasonal" timing patterns can be applied rather than settings for two timing patterns as described in reference to FIG. 48. In particular, on and off times to be applied during a spring time period can be entered in fields 4902 and 4904, on and off times to be applied during a summer time period can be entered in fields 4906 and 4908, on and off times to be applied during a fall time period can be entered in fields 4910 and 4912, and on and off times to be applied during a standard time period can be entered in fields 4914 and 4916.

While specific fields are provided for entering data for applying on and off times during the operation of a timer when a dedicated button is selected, it should be understood that other fields could be implemented with the given programming categories as shown, or other programming categories could be implemented. It should be noted that if no data is entered, default timing patterns would be implemented when a dedicated button is selected, where the default timing patterns could be based upon the 1-4 timing pattern codes associated with the four categories of timing patterns shown in FIG. 16.

Figure 50:
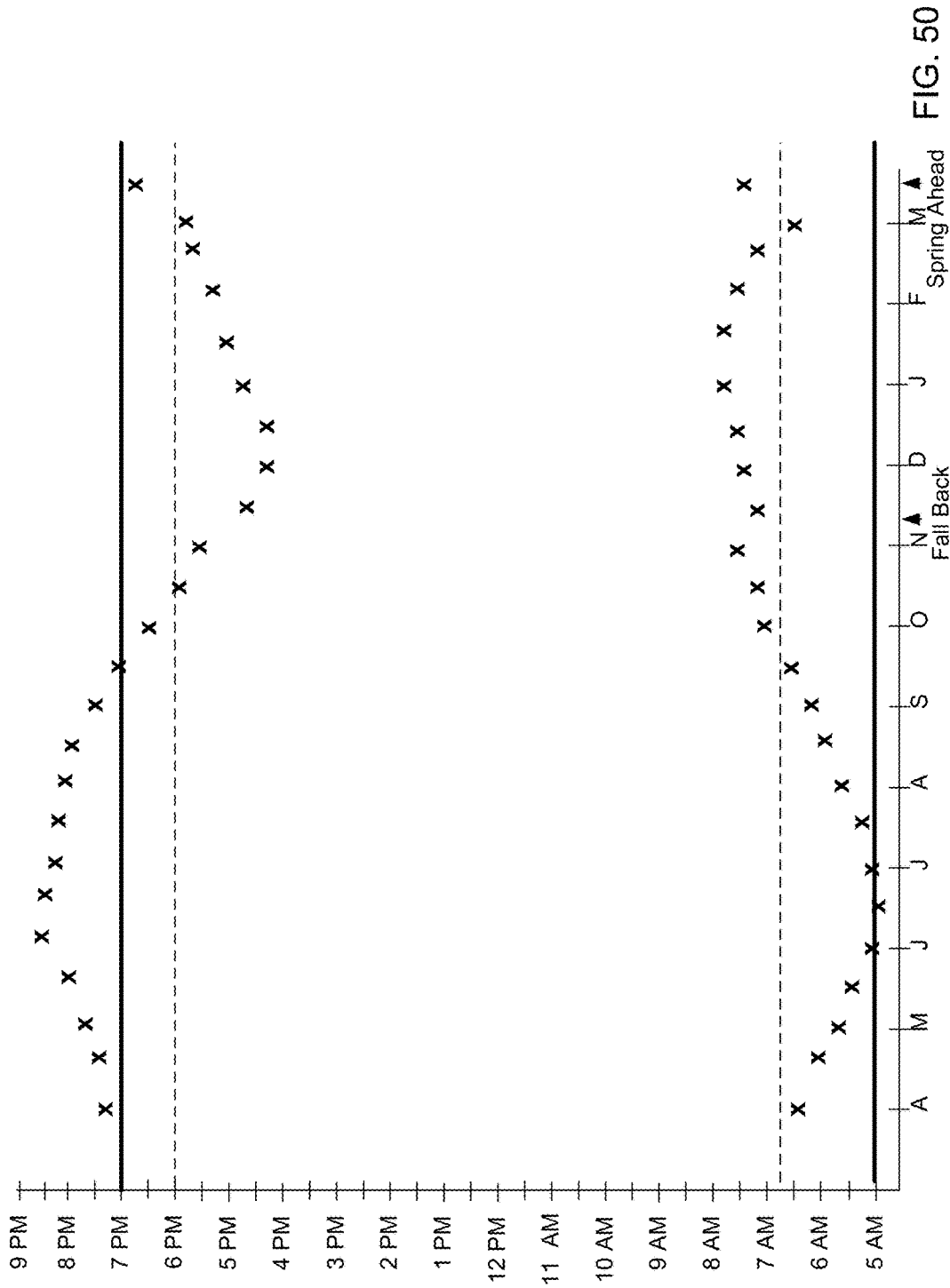
FIG. 50 is a chart showing dusk and dawn times over a year.
Figure 51:
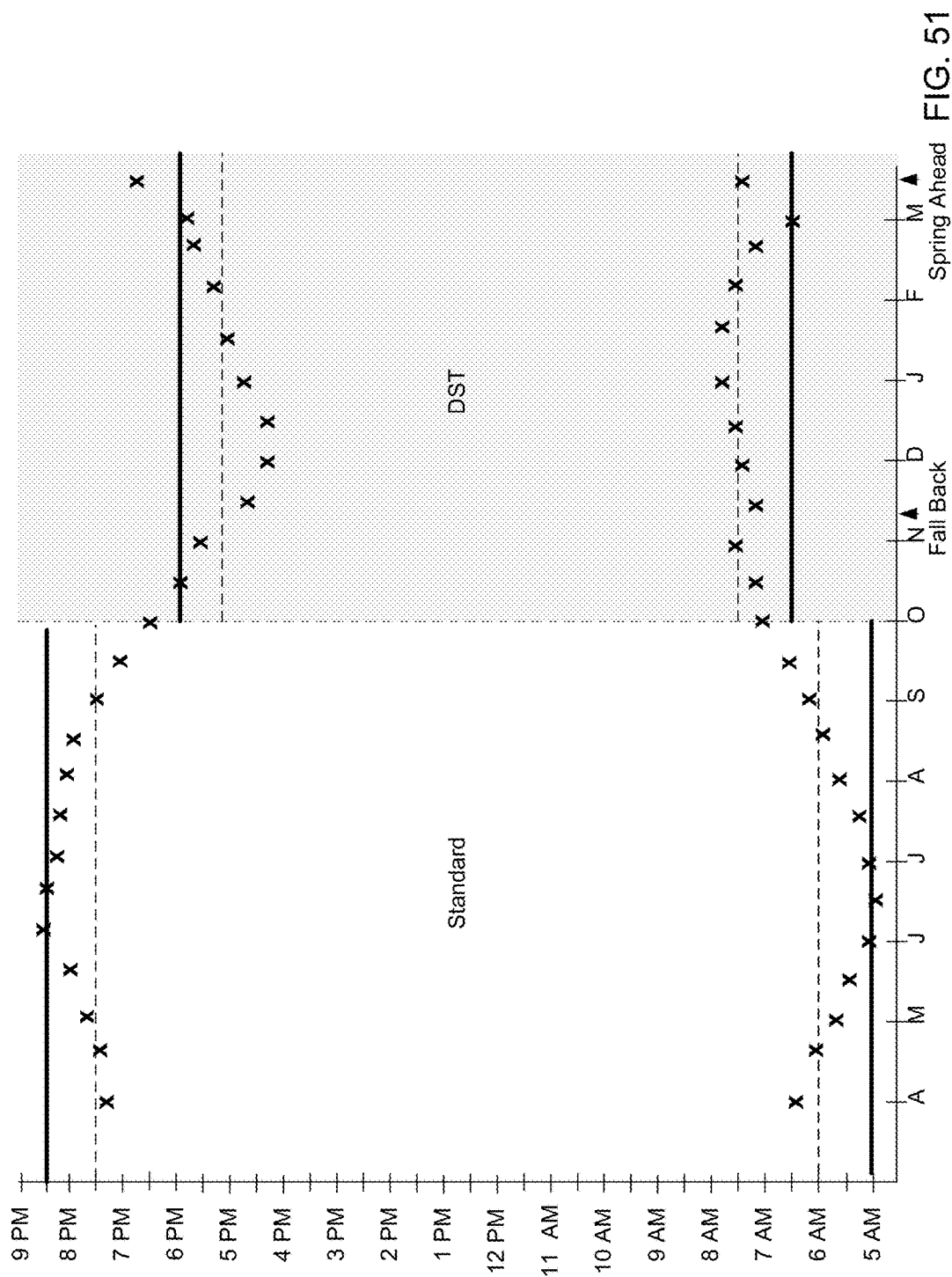
FIG. 51 is a chart showing dusk and dawn times over a year and which is divided into two periods including standard time and daylight savings time.
Figure 52:
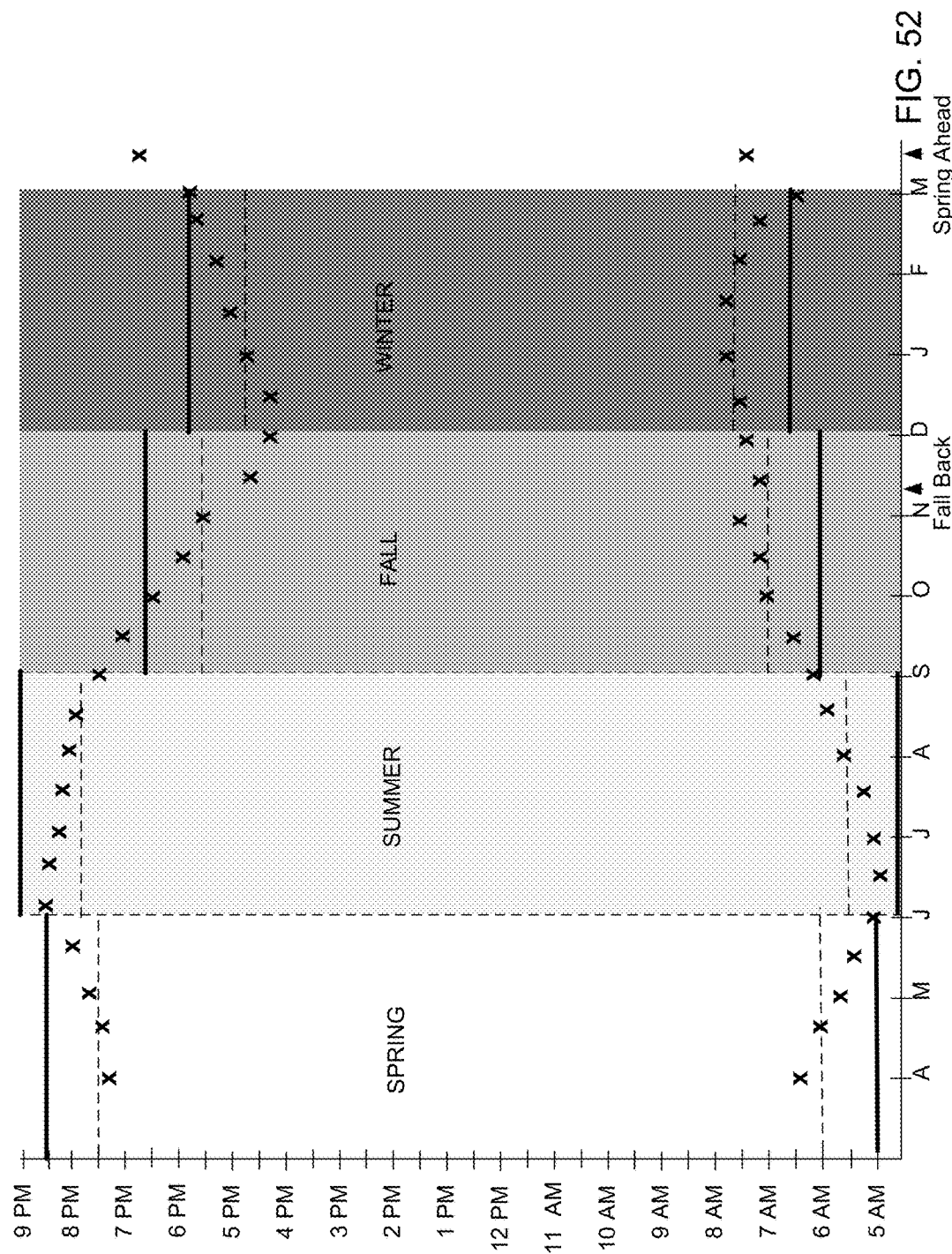
FIG. 52 is a chart showing dusk and dawn times over a year and which is divided into four periods including four seasons.

Charts provided in FIGS. 50-52 show dusk and dawn times throughout the year, average dusk and dawn times for periods, and the benefits of implementing certain on and off times during certain periods. Turning first to FIG. 50, a chart shows dusk and dawn times over a year, and an average time shown by the dashed line. As should be apparent from FIG. 50, considerable energy can be saved by setting on and off times at times other than the average dusk and dawn times. While the charts of FIGS. 51 and 52 provide timing patterns having better granularity and therefore provide a more desirable timing pattern, the chart of FIG. 50 provides perspective as to how much energy can be saved by implementing times other than astronomic dusk and dawn times. As is apparent from FIG. 50, each light controlled by a timer will be off for at least 2 hours longer each day compared to astronomic times by setting the on time for a light at 1 hour after dusk and setting the off time 1 hour before the average dawn.

Turning now to FIG. 51, a chart shows dusk and dawn times over a year and which is divided into two periods including standard time and daylight savings time. As can be seen in FIG. 51, the average dusk and dawn times are very different for the two time periods, and the timer on and off settings with a one hour offset is very different. By establishing the two time periods to apply two different time settings, it can be seen that different on and off times are much closer to the dusk and dawn times, and therefore provide an overall more desirable timing pattern for the year, while still providing savings by having the timer on less. Additional energy reduction can be achieved by moving the off time of the DST period to a fixed time, such as 5:00 AM and still provide a desirable overall timing pattern. As is apparent from FIG. 51, the time period for applying a "daylight savings time" timing pattern is different than the period between the "fall back" date for turning back the clock in the fall, and the "spring forward" date for returning the clock to normal time during the spring.

The embodiment of FIG. 52 shows 4 timing patterns associated with the 4 seasons. As can be seen, the average times for dusk and dawn during those periods are different, and selected times relate more closely to the average times, and therefore provide a better overall timing pattern. While DST and seasonal periods are shown, it should be understood that other periods could be defined, such as monthly periods. However, a greater number of periods may require additional memory for storing data and may make it more difficult to select a desirable timing pattern by a user. Accordingly, the number of periods selected (which may provide a better timing pattern) may be a tradeoff with additional memory requirements and reduced user-friendliness. One of the benefits of the various embodiments is that they are user friendly. Therefore, the number timing pattern options available to a user must be selected to ensure that the timer is still user friendly to operate while providing enough options to provide desirable timing patterns for a variety of different users.

Figure 53:
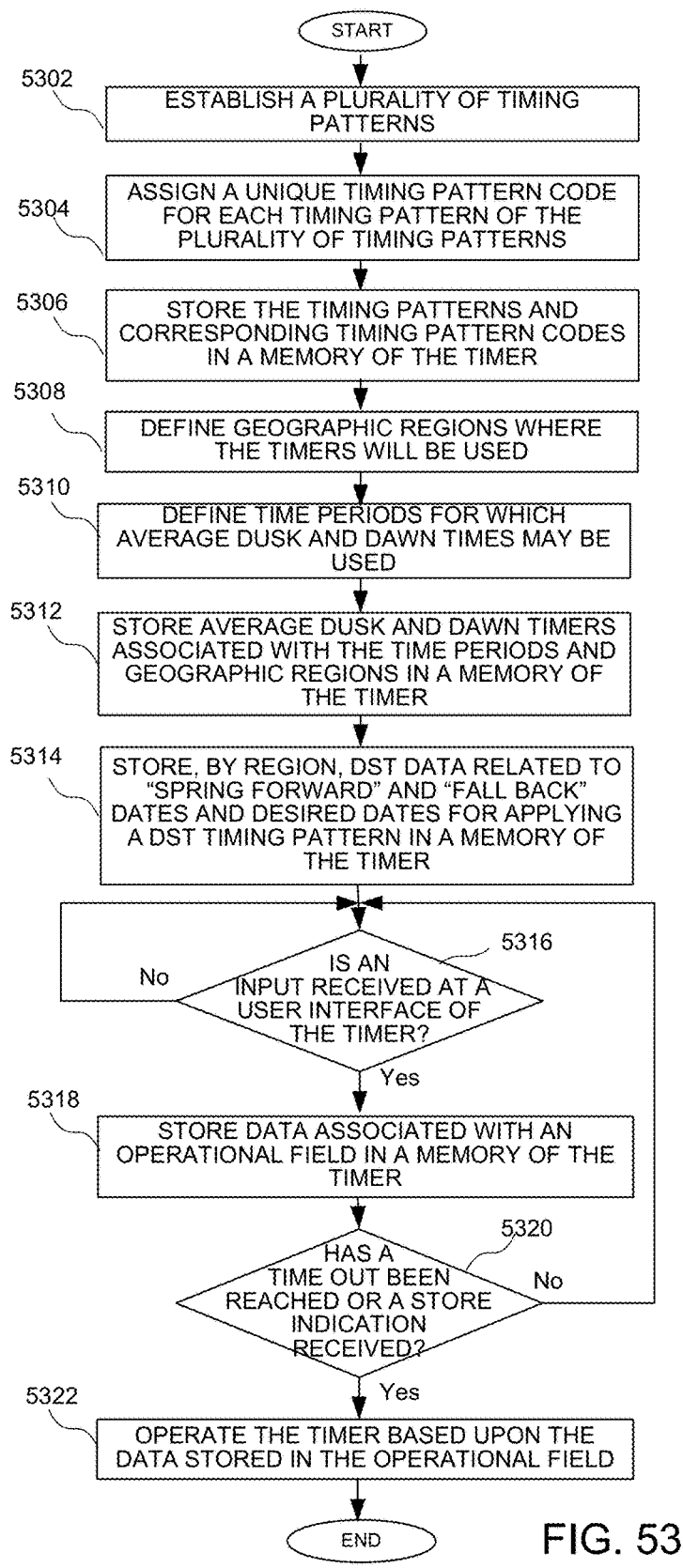
FIG. 53 is a flow chart showing a method of generating timing characterization data according to an embodiment of the present invention.

Turning now to FIG. 53, a flow chart shows a method of generating timing characterization data according to an embodiment of the present invention. A plurality of timing patterns are established at a step S302. A unique timing pattern code is assigned for each timing pattern of the plurality of timing patterns at a step S304. The timing patterns and corresponding timing pattern codes are stored in a memory of the timer at a step S306. Geographic regions where the timers will be used are also defined at a step S308. Time periods for which average dusk and dawn times may be used defined at a step S310. Average dusk and dawn timers associated with the time periods and geographic regions are stored in a memory of the timer at a step S312. DST data related to "spring forward" and "fall back" dates and desired dates for applying a DST timing pattern (if different than "spring forward" and "fall back") are stored, by region, in a memory of the timer at a step S314. It is then determined whether an input is received at a user interface of the timer at a step S316. Data associated with an operational field are stored in a memory of the timer at a step S318. It is then determined whether a time out been reached or a stored indication received at a step S320. The timer is operated based upon the data stored in the operational field at a step S322.

Figure 54:
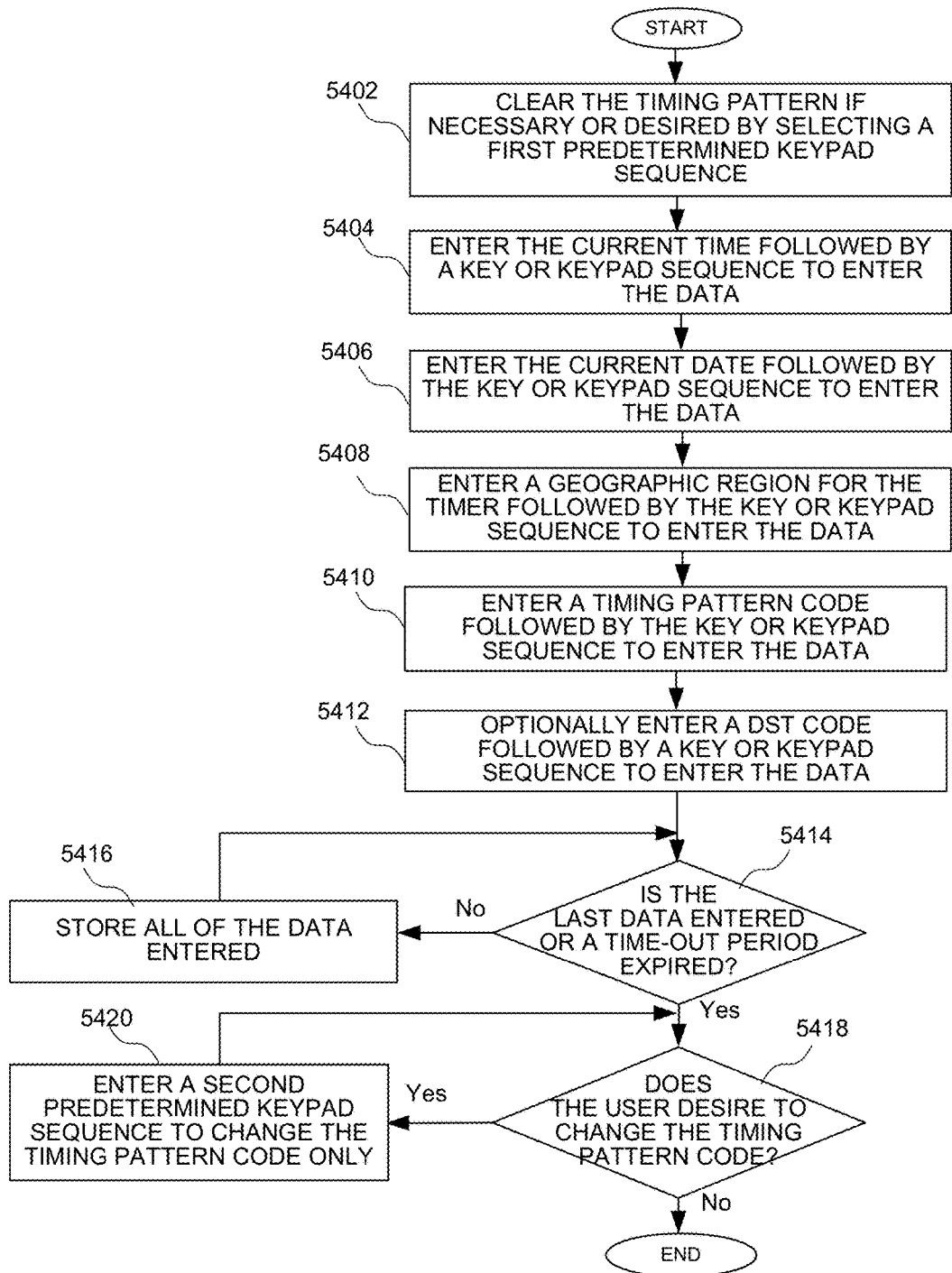
FIG. 54 is a flow chart showing a method of implementing a timer with a plurality of timing patterns according to an embodiment of the present invention.

Turning now to FIG. 54, a flow chart shows a method of implementing a timer with a plurality of timing patterns according to an embodiment of the present invention. The timing pattern is cleared if necessary or desired by selecting a first predetermined keypad sequence at a step S402. The current time is entered followed by a key or keypad sequence to enter the data at a step S404. The current date is entered followed by the key or keypad sequence to enter the data at a step S406. A geographic region for the timer is entered followed by the key or keypad sequence to enter the data at a step S408. A timing pattern code is entered followed by the key or keypad sequence to enter the data at a step S410. A DST code is optionally entered followed by a key or keypad sequence to enter the data at a step S412. It is then determined whether the last data is entered or a time-out period expired at a step S414. All of the data entered is stored at a step S416. It is then determined whether the user desires to change the timing pattern code at a step S418. A second predetermined keypad sequence is entered to change the timing pattern code only at a step S420.

Figure 55:
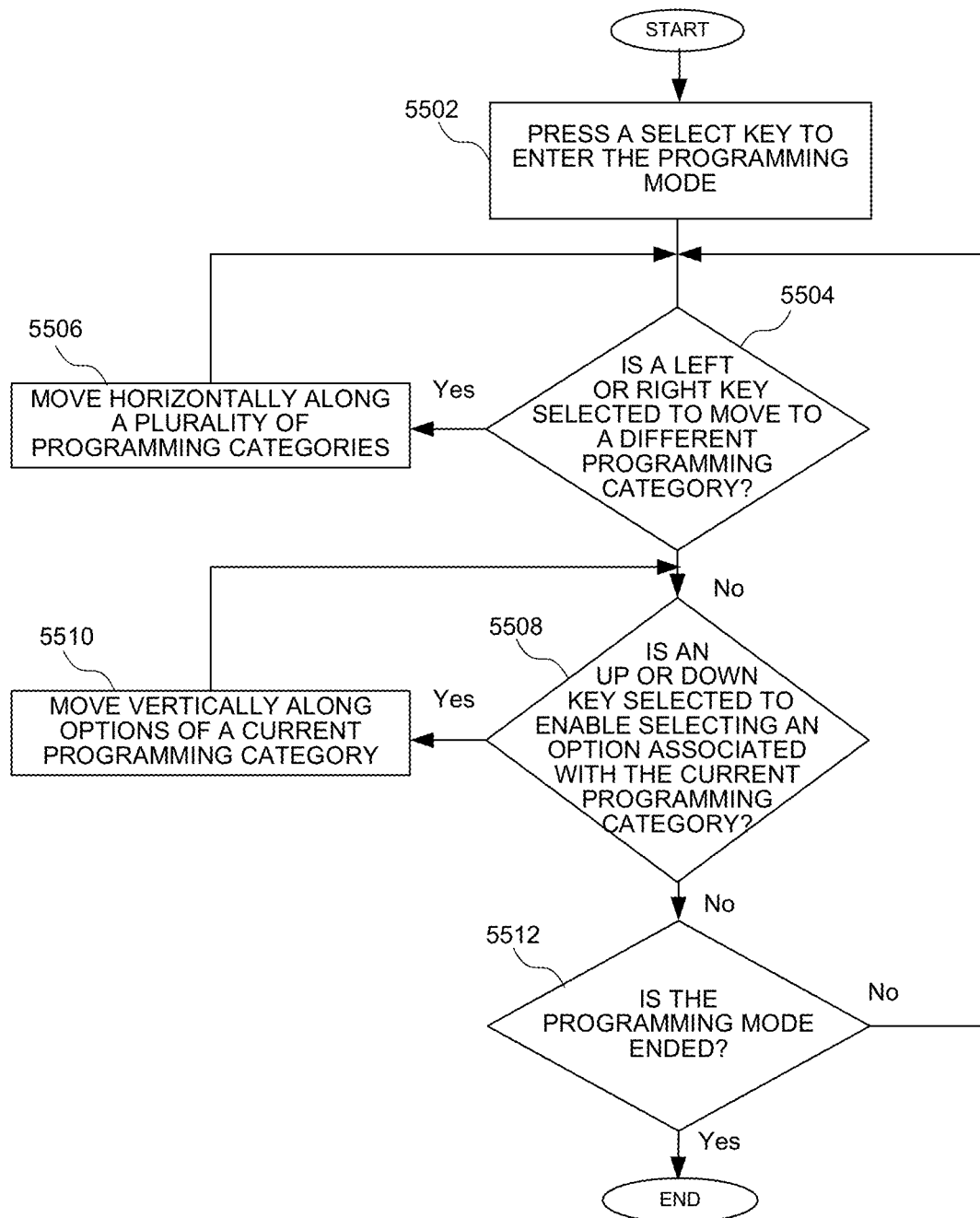
FIG. 55 is a flow chart showing a method of selecting a stored timing pattern using the keypad of FIGS. 2 and 4 according to an embodiment of the present invention.

Turning now to FIG. 55, a flow chart shows a method of selecting a stored timing pattern using the keypad of FIGS. 2 and 4 according to an embodiment of the present invention. A select key is pressed to enter the programming mode at a step S502. It is then determined whether a left or right key is selected to move to a different programming category at a step S504. The display will show another programming category as it moves horizontally along a plurality of programming categories at a step S506. It is then determined whether an up or down key is selected to enable selecting an option associated with the current programming category at a step S508. The display will show another option of a programming category as it moves vertically along options of a current programming category at a step S510. It is then determined whether the programming mode ended at a step S512.

Figure 56:
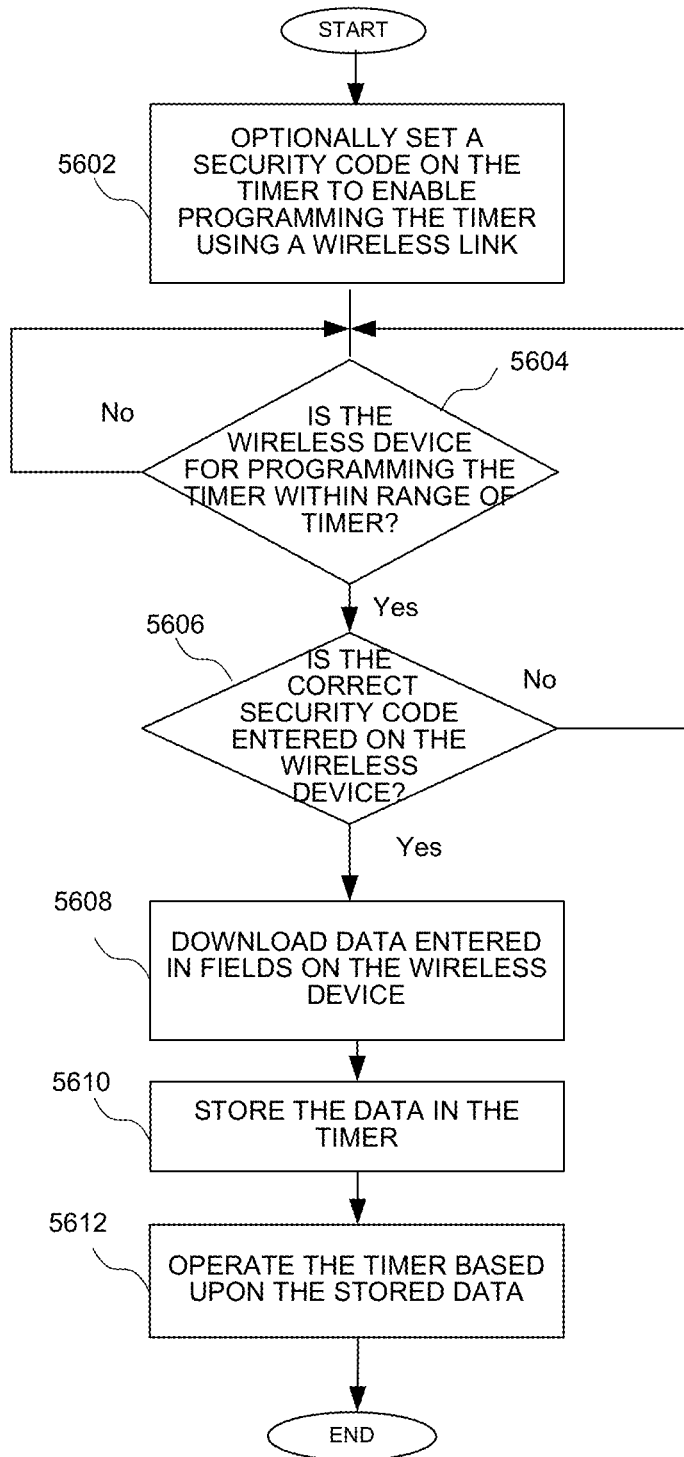
FIG. 56 is a flow chart showing a method of selecting a stored timing pattern using 5 key user interface of FIGS. 5 and 7 according to an embodiment of the present invention.

Turning now to FIG. 56, a flow chart shows a method of selecting a stored timing pattern using 5 key user interface of FIGS. 5 and 7 according to an embodiment of the present invention. A security code on the timer is optionally set to enable programming the timer using a wireless link at a step S602. It is then determined whether a wireless device for programming the timer within range of timer at a step S604. It is then determined whether the correct security code entered on the wireless device at a step S606. Data entered in fields on the wireless device are downloaded at a step S608. The data in the timer is stored at a step S610. The timer is operated based upon the stored data at a step S610.

It can therefore be appreciated that the new and novel timer and method of implementing a timer has been described. It will be appreciated by those skilled in the art that numerous alternatives and equivalents will be seen to exist which incorporate the disclosed invention. As a result, the invention is not to be limited by the foregoing embodiments, but only by the following claims.

I claim:

1. A programmable light timer for implementing a timing pattern, the programmable light timer comprising:
   a wireless communication circuit configured to receive, using a wireless communication protocol, a timing pattern and a location from a wireless communication device; and
   a memory storing the timing pattern;
   wherein programmable light timer application applies the timing pattern based upon the location received from the wireless communication device.

2. The programmable light timer of claim 1 wherein the location is associated with a geographical area.

3. The programmable light timer of claim 1 wherein the timing pattern includes a dusk setting or a dawn setting for the programmable light timer.

4. The programmable light timer of claim 2 wherein a time associated with the dusk setting or dawn setting is determined based upon the location stored in the memory of the programmable light timer.

5. The programmable light timer of claim 1 wherein a time associated with the dusk setting or the dawn setting is used for a predetermined period of time.

6. The programmable light timer of claim 1 wherein the timing pattern is associated with a first plurality of days of the week.

7. The programmable light timer of claim 1 wherein timing pattern uses astronomic data for one of an on time and an off time of the timing pattern and a fixed time for the other of the on time and the off time of the timing pattern.

8. A programmable light timer for implementing a timing pattern, the programmable light timer comprising:
   a wireless communication circuit configured to receive, using a wireless communication protocol, a location and a timing pattern having a dusk setting or a dawn setting from a wireless communication device; and
   a memory storing the timing pattern;
   wherein programmable light timer application applies a time associated with the dusk setting or the dawn setting of the timing pattern based upon the location received from the wireless communication device.

9. The programmable light timer of claim 8 wherein the location is associated with a geographical area.

10. The programmable light timer of claim 8 wherein a time associated with the dusk setting or the dawn setting is used for a predetermined period of time.

11. The programmable light timer of claim 10 wherein the time associated with the dusk setting or the dawn setting is used for a period of one month.

12. The programmable light timer of claim 8 wherein the timing pattern is associated with a first plurality of days of the week.

13. The programmable light timer of claim 12 wherein a second timing pattern associated with a second plurality of days of the week is stored in the memory.

14. The programmable light timer of claim 8 wherein timing pattern uses the dusk setting or the dawn setting for one of an on time and an off time of the timing pattern and a fixed time for the other of the on time and the off time of the timing pattern.

15. A method for implementing a timing pattern on a programmable light timer, the method comprising:
    receiving, using a wireless communication protocol, a timing pattern and a location from a wireless communication device; and
    storing the timing pattern in a memory of the programmable light timer;
    applying the timing pattern based upon the location received from the wireless communication device.

16. The method of claim 15 further comprising storing the location in the memory, wherein the location is associated with a geographical area.

17. The method of claim 15 wherein storing the timing pattern in the memory comprises storing a dusk setting or a dawn setting of the timing pattern for the programmable light timer.

18. The method of claim 17 further comprising determining a time associated with the dusk setting or the dawn setting based upon the location stored in the memory of the programmable light timer.

19. The method of claim 18 wherein applying the timing pattern based upon the location received from the wireless communication device comprises applying a time associated with the dusk setting or the dawn setting for a predetermined period of time.

20. The method of claim 15 wherein applying the timing pattern comprises applying the timing pattern having astronomic data for one of an on time and an off time of the timing pattern and a fixed time for the other of the on time and the off time of the timing pattern.

* * * * *